(12) United States Patent
Trapero Martin

(10) Patent No.: US 12,299,232 B2
(45) Date of Patent: *May 13, 2025

(54) ELECTRODE TOUCH DISPLAY

(71) Applicant: ANEXA LABS LLC, Mountain View, CA (US)

(72) Inventor: Ana Trapero Martin, Salamanca (ES)

(73) Assignee: BIOTRICITY, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/271,327

(22) PCT Filed: Dec. 27, 2021

(86) PCT No.: PCT/US2021/065213
§ 371 (c)(1),
(2) Date: Jul. 7, 2023

(87) PCT Pub. No.: WO2022/150206
PCT Pub. Date: Jul. 14, 2022

(65) Prior Publication Data
US 2024/0086010 A1    Mar. 14, 2024

Related U.S. Application Data

(63) Continuation of application No. 17/443,298, filed on Jul. 23, 2021, now Pat. No. 11,625,123, which is a (Continued)

(51) Int. Cl.
*G06F 3/041* (2006.01)
*G04G 21/02* (2010.01)
(Continued)

(52) U.S. Cl.
CPC ..... *G06F 3/041661* (2019.05); *G04G 21/025* (2013.01); *G04G 21/08* (2013.01); *G06V 40/1318* (2022.01)

(58) Field of Classification Search
CPC .................................................. G06F 3/0421
See application file for complete search history.

(56) References Cited

U.S. PATENT DOCUMENTS

| | | |
|---|---|---|
| 2009/0057124 A1 | 3/2009 | Orsley et al. |
| 2009/0219253 A1 | 9/2009 | Izadi et al. |
| | (Continued) | |

OTHER PUBLICATIONS

International Search Report and Written Opinion in International Application No. PCT/US2021/065213, mailed Jan. 26, 2022, (10 pages).

*Primary Examiner* — Nan-Ying Yang
(74) *Attorney, Agent, or Firm* — NIXON PEABODY LLP

(57) ABSTRACT

A smartwatch includes a multiresolution touch interface, a second electrode, and a third electrode. The transparent conductive screen includes a first electrode, a display layer, and an array of IR sensors. The display layer of the transparent conductive screen includes a plurality of display pixels, and is positioned beneath a bottom surface of the transparent conductive screen. The array of IR sensors of the transparent conductive screen is configured to detect infrared light transmitted through the transparent conductive screen. The second electrode is communicatively coupled to the first electrode. The first electrode and the second electrode together are configured to measure a bioimpedance of a user of the smartwatch. The third electrode is coupled to a bottom portion of the smartwatch, and is configured to contact an extremity of the user. The first electrode and the third electrode together are configured to measure ECG data associated with the user.

17 Claims, 22 Drawing Sheets

Related U.S. Application Data continuation of application No. 17/143,832, filed on Jan. 7, 2021, now Pat. No. 11,106,309.

(51) Int. Cl.
  G04G 21/08 (2010.01)
  G06V 40/13 (2022.01)

(56) References Cited

U.S. PATENT DOCUMENTS

| | | | |
|---|---|---|---|
| 2012/0105829 A1 | 5/2012 | Shin et al. | |
| 2012/0120013 A1 | 5/2012 | Kurz | |
| 2014/0021518 A1* | 1/2014 | Han | H01L 27/1443 438/59 |
| 2016/0004898 A1 | 1/2016 | Holz | |
| 2016/0049073 A1* | 2/2016 | Lee | G08C 23/04 340/12.5 |
| 2017/0011210 A1* | 1/2017 | Cheong | A61B 5/681 |
| 2017/0209053 A1* | 7/2017 | Pantelopoulos | A61B 5/7264 |
| 2019/0369799 A1 | 12/2019 | Jeon et al. | |
| 2020/0373490 A1* | 11/2020 | Gagne-Keats | H10K 71/00 |
| 2021/0151524 A1 | 5/2021 | Tang et al. | |

* cited by examiner

270

ELECTRODE TOUCH DISPLAY

CROSS-REFERENCE TO RELATED APPLICATIONS

This application is a 35 U.S.C. § 371 National Phase Application of PCT/US2021/065213, which is a continuation of U.S. patent application Ser. No. 17/443,298 filed Jul. 23, 2021 and entitled "METHODS FOR USING A MULTIRESOLUTION TOUCH INTERFACE," which is a continuation of U.S. patent application Ser. No. 17/143,832, filed Jan. 7, 2021 and entitled "ELECTRODE TOUCH DISPLAY," the disclosures of which are hereby incorporated by reference in their entireties.

TECHNICAL FIELD

The present disclosure relates generally to display devices, and more particularly, to electrode touch display devices.

BACKGROUND

Biopotential signals, such as electrocardiogram (ECG), bioimpedance and/or electrodermal activity (EDA), can provide valuable information regarding the status and function of the body, and are used in a variety of applications, including clinical diagnostics, fitness, and human computer interactions. In conventional wearables, the touch screens have been used for display and other user interface purposes. Because wearables tend to have a small form factor, adding a traditional sensor for detecting and/or processing biopotential signals can take extra space and add costs. Thus, there exists a need for a display device that implements sensor capabilities (e.g., to provide biomedical monitoring) and does not increase the number of components in the display device. The present disclosure is directed to solving these and other problems.

SUMMARY

According to some implementations of the present disclosure, a smartwatch includes a multiresolution touch interface, a second electrode, and a third electrode. The transparent conductive screen includes a first electrode, a display layer, and an array of IR sensors. The display layer of the transparent conductive screen includes a plurality of display pixels, and is positioned beneath the bottom surface of the transparent conductive screen. The array of IR sensors of the transparent conductive screen is configured to detect infrared light transmitted through the transparent conductive screen. The second electrode of the smartwatch is communicatively coupled to the first electrode of the smartwatch. The first electrode and the second electrode of the smartwatch together are configured to measure a bioimpedance of a user of the smartwatch. The third electrode of the smartwatch is coupled to a bottom portion of the smartwatch, and is configured to contact an extremity of the user. The first electrode and the third electrode of the smartwatch together are configured to measure ECG data associated with the user.

In some implementations, the third electrode of the smartwatch is configured to contact a wrist of the user, and the first electrode and the third electrode of the smartwatch together are configured to measure lead I ECG data associated with the user. In some implementations, the third electrode of the smartwatch is configured to contact a torso of the user, wherein the first electrode and the third electrode of the smartwatch together are configured to measure lead II or lead III ECG data associated with the user.

According to some implementations of the present disclosure, a multiresolution touch interface includes a transparent conductive screen, a display layer, and an array of IR sensors. The transparent conductive screen includes a first electrode. The display layer includes a plurality of display pixels. The display layer is positioned beneath a bottom surface of the transparent conductive screen. The array of IR sensors is configured to detect infrared light transmitted through the transparent conductive screen.

In some implementations, the multiresolution touch interface further includes a transistor layer between the display layer and the array of IR sensors. The transistor layer is configured to operate the plurality of display pixels. In some implementations, the transistor layer includes a transparent thin-film transistor. In some implementations, the multiresolution touch interface further includes an insulating opaque substrate between the transistor layer and a PCB of the multiresolution touch interface.

In some implementations, each of at least a portion of the plurality of display pixels includes an IR emitter for emitting infrared light detectable by the array of infrared sensors. In some implementations, each of at least the portion of the plurality of display pixels further includes an IR sensor of the array of IR sensors.

In some implementations, the multiresolution touch interface further includes an IR emitter layer positioned above or below the display layer. In some implementations, the multiresolution touch interface further includes an electrode contact positioned between at least a portion of the transparent conductive screen and at least a portion of a transparent adhesive. In some implementations, the electrode contact is coupled to the first electrode to facilitate conductivity from the first electrode to a PCB of the multiresolution touch interface.

In some implementations, the array of IR sensors is configured to detect a fingerprint of a user. In some implementations, the transparent conductive screen further includes a second electrode spaced apart from the first electrode. In some implementations, the first electrode and the second electrode are separately connected to a PCB of the multiresolution touch interface.

In some implementations, the first electrode of the multiresolution touch interface and a second electrode external to the multiresolution touch interface together are configured to generate ECG data associated with a user of the multiresolution touch interface. In some implementations, the first electrode of the multiresolution touch interface is configured to contact a finger of a first extremity of the user, and the second electrode external to the multiresolution touch interface is configured to contact a portion of a second extremity of the user. In some implementations, the multiresolution touch interface is coupled to or integrated in a top interface of an electronic device, and the second electrode is coupled to or integrated in a lateral sidewall of the electronic device.

In some implementations, the multiresolution touch interface is coupled to or integrated in a lateral interface of an electronic device, and the second electrode is coupled to or integrated in a bottom portion of the electronic device. In some implementations, the electronic device is a smartwatch configured to be worn on a wrist of the user such that the bottom portion of the electronic device contacts the wrist of the user.

In some implementations, the first electrode of the multiresolution touch interface and a second electrode external to the multiresolution touch interface together are configured to generate EDA data associated with a user of the multiresolution touch interface. In some implementations, the first electrode of the multiresolution touch interface is configured to contact a first finger of an extremity of the user, and the second electrode external to the multiresolution touch interface is configured to contact a second finger of the extremity of the user. In some implementations, the multiresolution touch interface is coupled to or integrated on a first wall of an electronic device, and the second electrode is coupled to or integrated in a second wall of the electronic device. In some implementations, the second electrode is coupled to or integrated in another multiresolution touch interface that is coupled to or integrated in the second wall of the electronic device.

According to some implementations of the present disclosure, a smartwatch includes a first electrode, a second electrode, and a third electrode. The first electrode is coupled to a multiresolution touch interface, which includes (i) a transparent conductive screen coupled to the first electrode, and (ii) one or more IR sensors configured to detect infrared light transmitted through the transparent conductive screen. The second electrode is coupled to a first sidewall of the smartwatch. The third electrode is coupled to a bottom portion of the smartwatch.

In some implementations, the multiresolution touch interface is coupled to a top portion of the smartwatch. In some implementations, the multiresolution touch interface is coupled to a second sidewall of the smartwatch. In some implementations, the second sidewall is opposite from the first sidewall of the smartwatch. In some implementations, a first PCB module is coupled to the multiresolution touch interface, and a second PCB module is coupled to the third electrode. In some implementations, an electronics housing of the multiresolution touch interface further includes a recess for receiving a strap, and the recess includes one or more electrical contacts for transmitting data generated by one or more sensors in the strap to the second PCB module.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
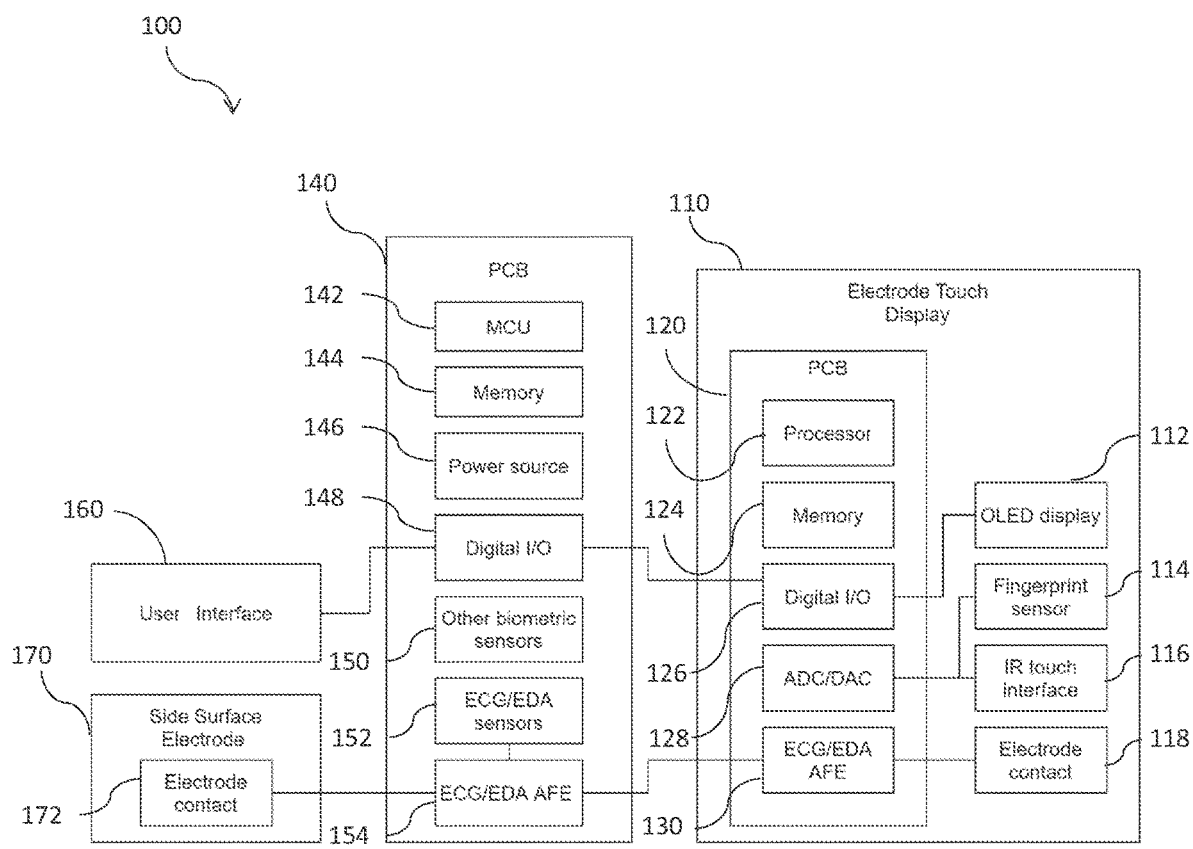
FIG. 1 is a functional block diagram of a system having an electrode touch display, according to some implementations of the present disclosure.

While the present disclosure is susceptible to various modifications and alternative forms, specific implementations and embodiments thereof have been shown by way of example in the drawings and will herein be described in detail. It should be understood, however, that it is not intended to limit the present disclosure to the particular forms disclosed, but on the contrary, the present disclosure is to cover all modifications, equivalents, and alternatives falling within the spirit and scope of the present disclosure as defined by the appended claims.

DETAILED DESCRIPTION

The present disclosure is described with reference to the attached figures, where reference numerals are used throughout the figures to designate similar or equivalent elements. The figures are not drawn to scale, and are provided merely to illustrate the instant disclosure. Several aspects of the disclosure are described below with reference to example applications for illustration.

Introduction

The present disclosure relates to a system integrating an electronic display, a touch interface, fingerprint scanning, and one or more transparent electrodes for health monitoring. The system may be a single compact unit that can be integrated into one or more smartwatches or other electronic devices. The system may also include a light emitting module that radiates infrared light, green light, and/or red light, a multiresolution sensor array disposed under the light emitting module, and a conductive transparent screen on top of the light emitting module that (i) protects the electronic display and (ii) records skin electrical properties (e.g., alone or in conjunction with other electrodes in the system).

In some implementations, the system may be integrated in electronic devices, such as smartwatches, smartphones, tablets, laptops, smart bracelets, arm bands, smart rings, smart glasses, automobile steering wheels, etc. For example, when integrated into a smartwatch, the system may further enable other functions, such as unlocking the smartwatch, zooming in/out, scrolling, volume control, and other applications. In addition to capturing electrocardiogram, electrodermal activity (e.g., skin conductance, galvanic skin response, electrodermal response, psychogalvanic reflex, skin conductance response, sympathetic skin response, skin conductance level), bioimpedance, heart rate, and other physiological parameters, the system may include (i) the electronic display for presenting information, (ii) fingerprint scanning for system authentication and/or application authentication, (iii) touch support to enable faster user input and/or interaction, or (iv) any combination thereof.

According to some implementations of the present disclosure, a smartwatch includes an electrode multiresolution touch interface, a second electrode, and a third electrode. The transparent conductive screen includes a first electrode, a display layer, and an array of infrared (IR) sensors. The display layer of the transparent conductive screen includes a plurality of display pixels, and is positioned beneath the bottom surface of the transparent conductive screen. The array of IR sensors of the transparent conductive screen is configured to transmit infrared light through the transparent conductive screen and detect light reflected back from the skin of a user in contact with the device. The first electrode of the smartwatch is communicatively coupled to the second electrode of the smartwatch. The first electrode and the second electrode of the smartwatch together are configured to measure a bioimpedance of a user of the smartwatch. The third electrode of the smartwatch is coupled to a bottom portion of the smartwatch, and is configured to contact an extremity of the user. The first electrode and the third electrode of the smartwatch together are configured to measure ECG data associated with the user.

In some implementations, the third electrode of the smartwatch is configured to contact a wrist of the user, and the first electrode and the third electrode of the smartwatch together are configured to measure lead I ECG data associated with the user. In some implementations, the third electrode of the smartwatch is configured to contact an ankle or a torso (e.g., a chest, or an abdomen) of the user, wherein the first electrode and the third electrode of the smartwatch together are configured to measure lead II or lead III ECG data associated with the user.

According to some implementations of the present disclosure, a multiresolution touch interface includes a transparent conductive screen, a display layer, and an array of IR sensors. The transparent conductive screen includes a first electrode.

In some implementations, the multiresolution touch interface further includes a transistor layer between the display layer and the array of IR sensors. In some implementations, the IR sensors could be used, alone or together with red and/or green light sensors, to monitor the pulse, heart rate, heart rate variability (HRV), respiratory rate, oxygen levels, blood pressure, glucose levels and other health metrics of the user. For example, heart rate can be derived from the detection of blood volume changes in the microvascular tissue of the finger of the user, which is detected from the reflected IR from the finger of the user. The transistor layer is configured to operate the display pixels and the IR emitters. In some implementations, the transistor layer includes a transparent thin-film transistor. In some implementations, the multiresolution touch interface further includes an insulating opaque substrate between the IR sensor layer and a PCB of the multiresolution touch interface.

In some implementations, each of at least a portion of the plurality of display pixels includes an IR emitter for emitting infrared light detectable by the array of infrared sensors. In some implementations, each of at least the portion of the plurality of display pixels further includes an IR sensor of the array of IR sensors.

In some implementations, the multiresolution touch interface further includes an IR emitter layer positioned above or below the display layer. In some implementations, the multiresolution touch interface further includes an electrode contact positioned between at least a portion of the transparent conductive screen and at least a portion of a transparent adhesive. In some implementations, the electrode contact is coupled to the first electrode to facilitate conductivity from the first electrode to a PCB of the multiresolution touch interface.

In some implementations, the array of IR sensors is configured to detect a fingerprint of a user. In some implementations, the transparent conductive screen further includes a second electrode spaced apart from the first electrode. In some implementations, the first electrode and the second electrode are separately connected to a PCB of the multiresolution touch interface.

In some implementations, the first electrode of the multiresolution touch interface and a second electrode external to the multiresolution touch interface together are configured to generate ECG data associated with a user of the multiresolution touch interface. In some implementations, the first electrode of the multiresolution touch interface is configured to contact a finger of a first extremity of the user, and the second electrode external to the multiresolution touch interface is configured to contact a portion of a second extremity of the user. In some implementations, the multiresolution touch interface is coupled to or integrated in a screen of a smartwatch or other electronic device, and the second electrode is coupled to or integrated in a lateral sidewall of the smartwatch or other electronic device.

In some implementations, the multiresolution touch interface is coupled to or integrated in a lateral interface of a smartwatch or other electronic device, and the second electrode is coupled to or integrated in a bottom portion of the smartwatch or other electronic device. In some implementations, the smartwatch or other electronic device is configured to be worn on a wrist of the user such that the bottom portion of the electronic device contacts the wrist of the user.

In some implementations, the first electrode of the multiresolution touch interface and a second electrode external to the multiresolution touch interface together are configured to generate EDA data associated with a user of the multiresolution touch interface. In some implementations, the first electrode of the multiresolution touch interface is configured to contact a first finger of an extremity of the user, and the second electrode external to the multiresolution touch interface is configured to contact a second finger of the extremity of the user. In some implementations, the multiresolution touch interface is coupled to or integrated in a first wall of an electronic device, and the second electrode is coupled to or integrated in a second wall of the electronic device. In some implementations, the second electrode is coupled to or integrated in another multiresolution touch interface that is coupled to or integrated in the second wall of the electronic device.

According to some implementations of the present disclosure, a smartwatch includes a first electrode, a second electrode, and a third electrode. The first electrode is coupled to a multiresolution touch interface, which includes (i) a transparent conductive screen coupled to the first electrode, and (ii) one or more IR sensors configured to detect infrared light transmitted through the transparent conductive screen. The second electrode is coupled to a first sidewall of the smartwatch. The third electrode is coupled to a bottom portion of the smartwatch. In some implementations, the multiresolution touch interface is coupled to a top portion of the smartwatch; and the second sidewall of the smartwatch may only include an electrode (i.e., no multiresolution touch interface). Additionally or alternatively, in some implementations, the multiresolution touch interface is coupled to a second sidewall of the smartwatch. In some implementations, the second sidewall is opposite from the first sidewall of the smartwatch. In some implementations, a first PCB module is coupled to the multiresolution touch interface, and a second PCB module is coupled to the third electrode. In some implementations, the smartwatch housing further includes a recess for receiving a strap, and the recess includes one or more electrical contacts for powering one or more sensors in the strap via the smartwatch power source (e.g., battery/batteries) and transmitting data generated by the one or more sensors in the strap to the second PCB module.

Electrode Touch Display System

Referring to FIG. 1, a functional block diagram of a system 100 having an electrode touch display 110 is shown. The system 100 may further include a user interface 160, and/or a side surface electrode 170. The electrode touch display 110 includes a first PCB module 120, a display screen (e.g., the OLED display 112), a fingerprint sensor 114, an IR-based touch interface 116, and one or more electrode contacts (hereinafter, electrode contact 118). The first PCB module 120 is configured to manage the synchronization and/or parallel functioning of the display screen 112, the fingerprint sensor 114, the IR-based touch interface 116, and the one or more electrode contacts 118. The one or more electrode contacts 118 can generate an electrode signal for ECG, bioimpedance, and/or EDA measurements.

In some implementations, the first PCB module 120 includes one or more processors (hereinafter, processor 122), a memory 124, a digital input/output (I/O) 126, an analog-to-digital converter (ADC) or digital-to-analog converter (DAC) 128, and an ECG/EDA analog front end (AFE) 130. In some implementations, the PCB integrated in the electrode touch display includes ECG, EDA and/or bioimpedance sensors. The first PCB module 120 is generally used to control (e.g., actuate) the various components of the system 100 and/or analyze data obtained and/or generated by the components of the system 100. The processor 122 can be a general or special purpose processor or microprocessor. While one processor 122 is shown in FIG. 1, the first PCB module 120 can include any suitable number of processors (e.g., one processor, two processors, five processors, ten processors, etc.) that can be in a single housing, or located remotely from each other.

The processor 122 can be coupled to and/or positioned within, for example, a housing of the electrode touch display 110. Additionally or alternatively, another processor 122 can be coupled to and/or positioned within a housing of the user interface 160, and/or within a housing of the side surface electrode 170. The processor 122 can be centralized (within one such housing) or decentralized (within two or more of such housings, which are physically distinct). In such implementations including two or more housings containing the processor 122, such housings can be located proximate and/or remote from each other. For example, a first processor (or a first portion of the processor) may be coupled to and/or positioned within the housing or enclosure of the electrode touch display 110, and a second processor (or a second portion of the processor) may be coupled to and/or positioned outside of the electrode touch display 110 (e.g., the cloud, or another physically distinct electronic component).

The memory 124 stores machine-readable instructions that are executable by the processor 122 of the first PCB module 120. The memory 124 can be any suitable computer readable storage device or media, such as, for example, a random or serial access memory device, a hard drive, a solid state drive, a flash memory device, etc. While one memory 124 is shown in FIG. 1, the system 100 can include any suitable number of memories 124 (e.g., one memory, two memories, five memories, ten memories, etc.). One or multiple memory devices can be used to store raw sensor data collected by sensors of the electronics module 102, intermediate calculations, computed health metrics, and other data. In some cases, Random Access Memory (RAM) and Read Only Memory (ROM), can be included, optionally along with FLASH memory and/or EPROM memory. Although the RAM is volatile, the processor 122 interacts with RAM to get the data and instructions for processing. The memory 124 can be coupled to and/or positioned within the dedicated PCB module of the electrode touch display 110, within a housing of the user interface 160, and/or within a housing of the side surface electrode 170. Like the processor 122, the memory device 124 can be centralized (within one such housing) or decentralized (within two or more of such housings, which are physically distinct).

In some implementations, the memory 124 stores a user profile associated with the user. The user profile can include, for example, demographic information associated with the user, biometric information associated with the user, medical information associated with the user, self-reported user feedback, self-reported dietary intake or exercise frequency, historical and/or current health data generated by the system 100, or any combination thereof. The demographic information can include, for example, information indicative of an age of the user, a gender of the user, a race of the user, a geographic location of the user, a relationship status, a family history of heart conditions, an employment status of the user, an educational status of the user, a socioeconomic status of the user, or any combination thereof. The medical information can include, for example, information indicative of one or more medical conditions associated with the user, medication prescriptions and intakes, or both. The medical information data can further include previous ECG/EDA test data. The self-reported user feedback can include information indicative of a self-reported subjective stress level of the user, a self-reported subjective fatigue level of the user, a self-reported subjective health status of the user, a recent life event experienced by the user, or any combination thereof. In some implementations, the memory 124 stores media content that can be displayed on the display screen 112.

The display screen 112 is generally used to display image(s) including still images, video images, or both. In some implementations, the display screen 112 acts as a graphic user interface (GUI) configured to display the image(s), video(s), and an input interface. The display screen 112 can be an OLED display, an AMOLED display, an LED display, an LCD display, or the like. The input interface can be, for example, a touchscreen or touch-sensitive substrate, or any sensor system configured to sense inputs made by a human user interacting with the electrode touch display 110, such as functioning as a mouse, a trackpad, or a keyboard.

Additionally or alternatively, the system 100 may include the user interface 160. The user interface 160 can be configured to receive data (e.g., physiological data) from the biometric sensors 150 such that the data can be stored in the memory 144 and/or analyzed by the MCU 142. The user interface 160 can communicate with the biometric sensors 150 using a wired connection or a wireless connection (e.g., using an RF communication protocol, a Wi-Fi communication protocol, a Bluetooth communication protocol, an IR communication protocol, over a cellular network, over any other optical communication protocol, etc.). The user interface 160 can include an antenna, a receiver (e.g., an RF receiver), a transmitter (e.g., an RF transmitter), a transceiver, or any combination thereof. The user interface 160 can also include one more processors and/or one more memory devices that are the same as, or similar to, the processor 122 and the memory device 124 described herein. In some implementations, the user interface 160 is coupled to or integrated in the electrode touch display 110. In other implementations, the user interface 160 is coupled to or integrated (e.g., in a housing) with the MCU 142 and/or the memory 144. In some implementations, a haptic actuator, LEDs, a microphone array, and/or speakers can be included, among other elements as part of the user interface 160.

While the processor 122 and the memory 124 are described and shown in FIG. 1 as being a separate and distinct component of the system 100, in some implementations, the processor 122 and/or the memory 124 are integrated and/or coupled to each other. Alternatively, in some implementations, the processor 122 can be located in a cloud (e.g., integrated in a server, integrated in an Internet of Things (IoT) device, connected to the cloud, be subject to edge cloud processing, etc.), located in one or more servers (e.g., remote servers, local servers, etc., or any combination thereof.

The IR-based touch interface 116 may include an infrared (IR) sensor or an array of IR sensors that outputs an infrared image from the recorded data reproducible as one or more infrared images (e.g., still images, video images, or both) that can be stored in the memory 124 and/or analyzed by the processor 122. The infrared data from the IR-based touch interface 116 can be used to determine one or more health-related parameters, including a temperature of the user, a heart rate of the user, and/or the oxygen levels in blood of the user.

In some implementations, the IR-based touch interface 116 is the fingerprint sensor 114. In other implementations, the IR-based touch interface 116 is separate and distinct from the fingerprint sensor 114. The processor 122 and the memory 124 of the first PCB module 120 are configured to store and/or manage data, and to control the digital I/O 126 of the electrode touch display 110. In some implementations, the digital I/O 126 is connected to the display screen 112. In order to read the recorded data from the IR-based touch interface 116 that may constitute the touch-fingerprint reading surface (e.g., the fingerprint sensor 114), the first PCB module 120 includes the ADC/DAC 128.

Figure 2:
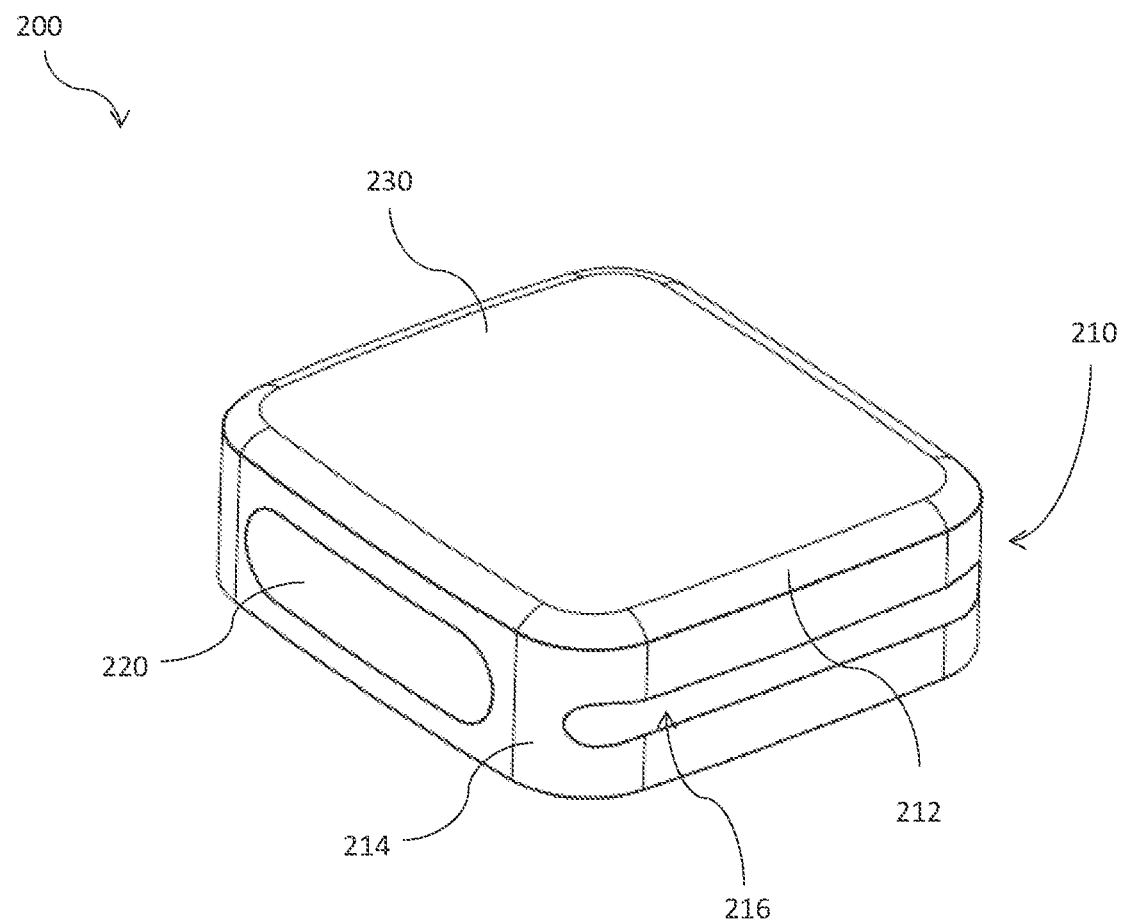
FIG. 2 illustrates an isometric view of a smartwatch having at least a portion of the system of FIG. 1, according to some implementations of the present disclosure.

Additionally or alternatively, the system 100 can include a second PCB module 140 (e.g., within an electronic device that includes the electrode touch display 110). The second PCB module 140 can include a microcontroller (MCU) 142, a memory 144, a power source 146, a digital I/O 148, one or more other biometric sensors 150, ECG/EDA sensors 152, ECG/EDA AFE 154, or any combination thereof. In some implementations, the system 100 only has one PCB, which includes one or more components of the first PCB module 120 and the second PCB module 140. The one or more biometric sensors 150 interface with the user through a sensor window or directly on the bottom of the electronics module gathering health data (e.g., physiological data, stress measures, and/or other types of data). In some implementations, the power source 146 is a rechargeable lithium polymer (LiPo) battery that can be recharged using the connecting member installed on the floor of the bottom portion 218 of the smartwatch 200 (FIG. 2). In some implementations, the battery can be charged by magnetic and/or other wireless charging technologies.

In some implementations, the system 100 includes at least one Near Field Communication (NFC) module, and a single antenna for the NFC module that is used to enable pairing communications, charging and contactless transactions. For example, a NFC transaction using the electronic device (e.g., the smartwatch 200 in FIG. 2) can be validated via the fingerprint sensor 114 on the electrode touch display 110, ECG biometric authentication on the electrode touch display 110, passwords, PINs, voice identification, facial recognition, or eye scanners in the electronic device (e.g., in a smartwatch 200) or any combination thereof in a multi-factor authentication. In some examples, the electronic device needs to be unlocked via the fingerprint sensor 114 authentication before a NFC transaction can be performed using the NFC module. In some implementations, the system 100 only needs to be fingerprint unlocked immediately after the user first puts on the electronic device and the system 100 detects that it is being worn by the same user using a combination of sensor data (e.g., temperature, PPG, bioimpedance, etc.); once unlocked and while continually worn, the system 100 can perform NFC transactions.

While the user interface 160 and the side surface electrode 170 are shown in FIG. 1 as separate and distinct from the electrode touch display 110, the electrode touch display 110 can include the user interface 160 and/or the side surface electrode 170. While the components of the second PCB module 140 are shown in FIG. 1 as separate and distinct from the first PCB module 120, the first PCB module 120 can include one or more of the components of the second PCB module 140.

While the electrode touch display 110 is shown as including the first PCB module 120, the OLED display 112, the fingerprint sensor 114, the IR touch interface 116, the electrode contact 118, more or fewer components can be included in an electrode touch display or surface of the present disclosure for detecting biopotential signals. For example, a first alternative electrode touch display or surface includes the first PCB module 120, and one or more electrode contacts 118. As another example, a second alternative electrode touch display or surface includes the PCB 120, the OLED display 112, the IR touch interface 116, and one or more electrode contacts 118. As another example, a third alternative electrode touch display or surface includes the first PCB module 120, the fingerprint sensor 114, and the electrode contact 118. As another example, a fourth alternative electrode touch display or surface includes the first PCB module 120, the IR touch interface 116 with fingerprint sensor resolution 114, and the electrode contact 118. As yet another example, a fifth alternative electrode touch display or surface includes the first PCB module 120, the OLED display 112, and one or more electrode contacts 118.

While system 100 is shown as including all of the components described herein, more or fewer components can be included in a system of the present disclosure. Thus, various systems for implementing the present disclosure can be formed using any portion or portions of the components shown and described herein and/or in combination with one or more other components.

Example Devices

Biopotential signals, such as ECG, bioimpedance and/or EDA, can be acquired noninvasively using electrodes in contact with the surface of the skin. According to some implementations of the present disclosure, electronic devices, such as a smartwatch 200, can be utilized for continuous physiological monitoring via real-time measurements of vital biometric signs, which are able to provide clinically relevant information for disease diagnosis, health tracking (e.g., tracking the evolution of a disease or medical condition) and preventive healthcare. The electronic devices can be any devices that are configured to contact two separate locations on the user's skin, with or without prompt.

In some implementations, the electronic devices can provide automatic and/or passive monitoring (e.g., launching a game for a child, and taking measurements when the child is not aware of them being taken). For example, in some such implementations, an electrode touch display (e.g., the same as, or similar to, the electrode touch display 110 of the system 100) may be configured to display a game for the child to hold two fingers (e.g., from the same hand, or from both hands) at two locations on the electrode touch display, where biopotential signals are detected and/or recorded from the two locations. As another example, the electrode touch display may be configured to continually monitor and/or record data so long as biopotential signals can be detected from two fingers (e.g., from the same hand, or from both hands) at two locations (e.g., corresponding to two electrodes) on the electrode touch display.

For example, in some implementations, the electronic devices are smart glasses. In some cases, the temple of the smart glasses can include an electrode touch display that, with or without the display functionality, serves as a user interface. Moreover, when the finger of a user contacts the electrode touch display, biopotential and bioimpedance signals can be measured between the right/left hand and the right/left ear of a user in contact with the inner electrodes in the temple of the smart glasses. Additionally or alternatively, in some implementations, biopotential and bioimpedance signals can be measured via the nose of the user in contact with the inner electrodes in the bridge or nose pads of the glasses.

As another example, in some implementations, the electronic devices are headphones (e.g., earbuds, in-ear, over-the-ear). Similar to the smart glasses, the smart headphones could include an electrode touch surface on the exterior of the ear cups or earbuds which could be used for unlocking and/or UI purposes. Moreover, in conjunction with electrodes inside the ear cups/earbuds in contact with the ear of a user, the electrode touch surface, when in stable contact (e.g., continuous contact for a predetermined duration) with the finger of a user, can be used to record biopotential and bioimpedance signals.

As a further example, in some implementations, the electronic device is a smart mirror. In some implementations, both hands could be asked to remain in contact with differentiated electrode areas in the electrode touch display surface of the mirror in order to measure ECG, EDA, bioimpedance and other bioelectric and optical metrics (e.g., pulse).

As yet another example, in some implementations, the electronic device is a smart steering wheel where the transparent electrode touch display could provide directions from the GPS and measure ECG, bioimpedance and/or EDA.

FIG. 2 illustrates an isometric view of an electronic device having at least a portion of the system 100 of FIG. 1. The electronic device may be used to monitor health parameters. In this example, the electronic device is implemented as a smartwatch 200. In some implementations, smartwatch 200 includes a housing 210 for one or more processors (e.g., the processor 122 of the system 100), one or more sensors (e.g., the fingerprint sensor 114, other biometric sensors 150, ECG/EDA sensors 152 of the system 100), one or more batteries (e.g., the power source 146 of the system 100), and one or more printed circuit boards (e.g., including the first PCB module 120 and/or the second PCB module 140 of the system 100), and/or other electronic components.

Figure 4:
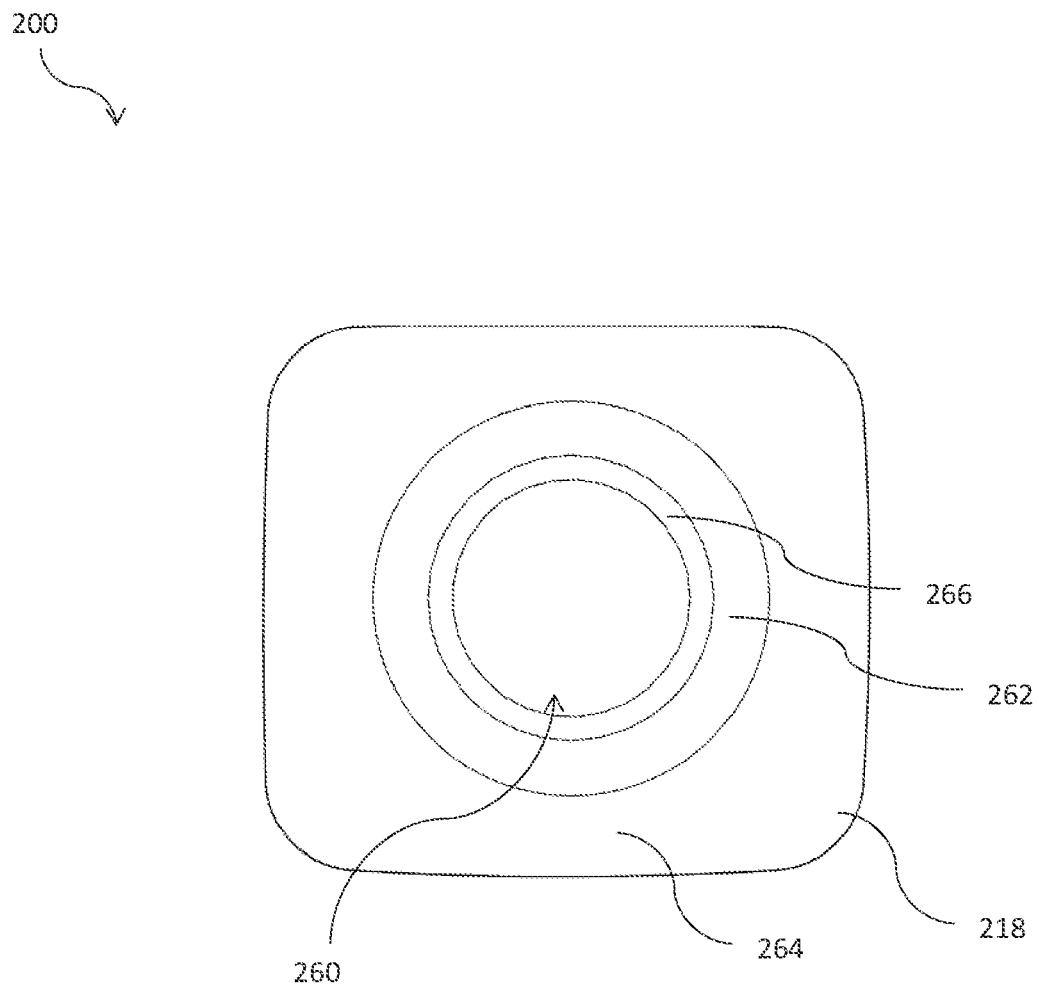
FIG. 4 illustrates a bottom view of the smartwatch of FIG. 2, according to some implementations of the present disclosure.

The housing 210 includes a top portion 212, a lateral portion 214, and a bottom portion 264 (FIG. 4). In some implementations, the lateral portion 214 of the housing 210 includes a recess 216 for receiving a watch band (e.g., the strap 290 in FIG. 9). In some implementations, from a top view, the electronic device (e.g., the smartwatch 200) is shaped like a square with rounded corners; and from a side view, the electronic device has a rectangular cross-section. In alternative implementations, from a top view, the smartwatch can be shaped like a rectangle, oval, circle or any other geometric shape. The housing (e.g., the housing 210 of the smartwatch 200) can be made from a rigid material (e.g., aluminum, stainless steel, titanium, plastic composites, polymer composites, ceramics, or any combination thereof). In some implementations, the housing can dissipate heat from components within the electronic device. The housing 210 of the smartwatch 200 can be made from a non-corrosive, chemically resistant material that can withstand high temperature fluctuations.

In some implementations, the lateral portion 214 of the smartwatch 200 includes four sidewalls. On either or both of two opposite ends, the sidewalls can include grooves (e.g., the recess 216) for attaching a strap (e.g., the strap 290 in FIG. 9) to the smartwatch 200. The strap can be made of different materials such as leather, nylon, stainless steel, silicone rubber, polyurethane, ceramic or any combination thereof. In some implementations, the strap can include health and/or environmental sensors to measure additional physiological data from the wrist of the user. For example, the strap may combine high-density EMG sensors and machine learning techniques to create a new way to interface with the computing unit that detects the movement of all five digits from the nerves monitored in the wrist. The sensors in the strap would be driven by a connection with the PCB 140 in the smartwatch 200 through electrical contacts in the recess 216. In some implementations, the electronics in the strap would obtain energy from the power source on the connected PCB 140 of the electronic device (e.g., from a smartwatch 200). In some implementations, the strap can include other electronic components (e.g., auto-adjusting strain gauges or thermal patches to regulate the user's temperature). In some implementations, one or more components of the smartwatch 200 together with the strap could constitute a smartwatch.

Figure 3:
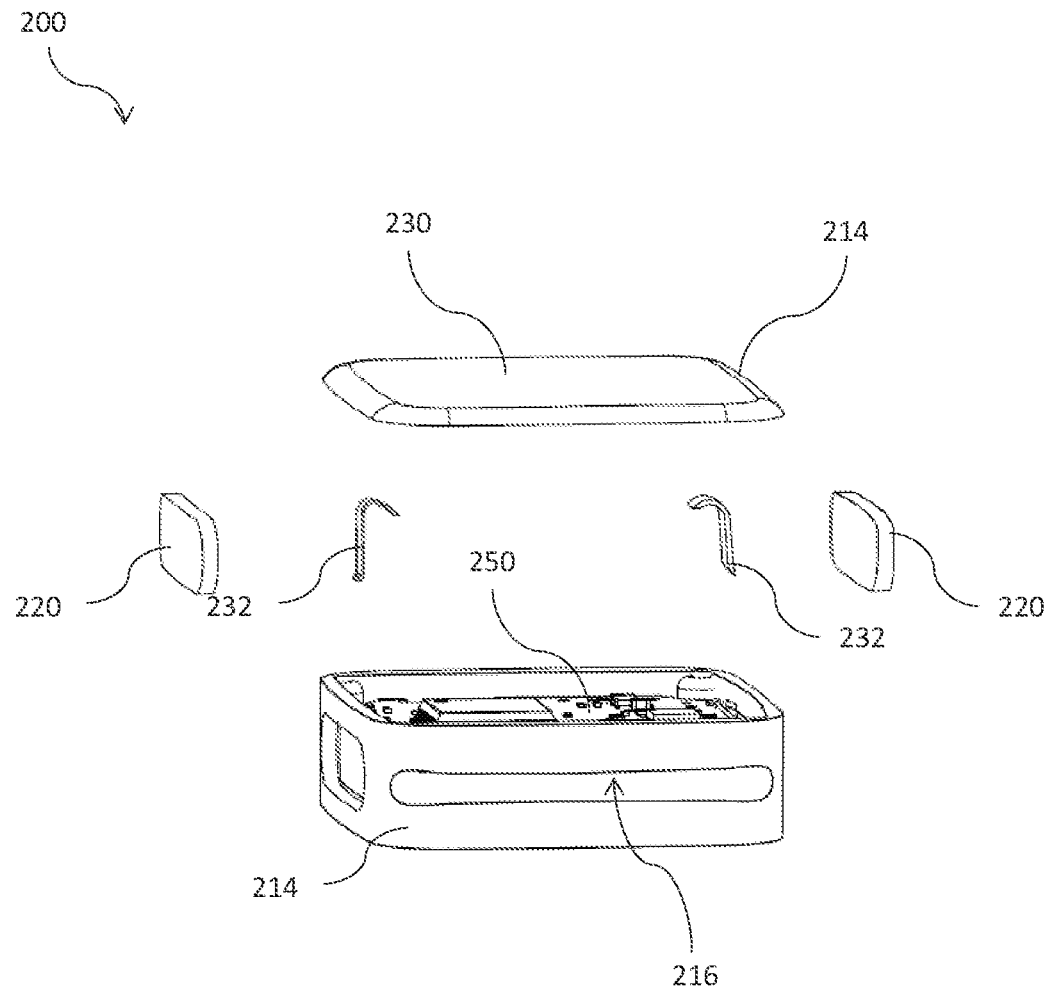
FIG. 3 illustrates an exploded view of the smartwatch of FIG. 2, according to some implementations of the present disclosure.

FIG. 3 illustrates an exploded view of the smartwatch 200 of FIG. 2, showing some components in the smartwatch 200. The same reference numerals in FIG. 3 refer to the same, or similar, elements as those in FIG. 2. The top portion 212 and the lateral portion 214 of the housing, when interfacing with one another, form a sealed enclosed chamber. In some implementations, the top portion 212 includes a top interface 230. Additionally or alternatively, in some implementations, the lateral portion 214 of the housing 210 includes one or more lateral interfaces 220 (hereinafter, the lateral interface 220). In some implementations, the lateral interface 220 is the same as, or similar to, the top interface 230.

In some such implementations, the top interface 230 is an integrated glass and display combination that enables touch interaction. Additionally or alternatively, in some implementations, the top interface 230 includes at least a portion of the electrode touch display 110 of the system 100 (FIG. 1). In some implementations, a display mode can be set such that if the top interface 230 is not in use, the top interface 230 is turned off. Additionally or alternatively, in some implementations, a light sensor can be embedded under the top interface 230 to calibrate the brightness and colors of the top interface 230. In some implementations an infrared thermal camera could be embedded under the top interface 230 of the electronic device to detect and locate elevated temperatures on the body of the user in order to diagnose musculoskeletal problems (e.g., diagnose a variety of disorders associated with the neck, back and limbs), to detect circulation problems (e.g., deep vein thrombosis), to detect infections and/or for facial recognition. In order to perform the aforementioned and alternative thermal recordings, the smartwatch screen in which the camera is integrated should face the area of the user to be recorded. For example, the smartwatch screen could be positioned towards the face of the user for facial recognition using thermal imaging feature extraction or towards the opposite hand of the user to detect circulation problems. Additionally or alternatively, in some implementations a regular camera can be embedded under the top interface 230 to perform facial recognition authentication. In some implementations, the first PCB module 120 (FIG. 1) is coupled to the top interface 230 and/or the lateral interface 220 using one or more flexible PCB connectors 232, as shown in FIG. 3. In some implementations, the smartwatch 200 may further include a haptic feedback motor.

Inside the housing 210 (FIG. 2), the smartwatch 200 includes at least one PCB 250. In some implementations, the PCB 250 is the same as, or similar to, the PCB 140 in FIG. 1. The PCB 250 can include one or more components of the second PCB module 140 of the system 100 (FIG. 1). The PCB 250 can also include additional components. For example, in some implementations, the PCB 250 can include the processor 122, the microcontroller 142, a central processing unit, a neural processing unit, a power management unit, or any combination thereof, for managing the acquired data and displaying health parameters on the top interface 230 and/or on the lateral interface 220, each of which could include the electrode touch display 110.

In some implementations, the PCB 250 is configured to communicate (wired or wirelessly) with other electronic devices (e.g., a laptop, a tablet, a smartphone, or another computing device). The communication interfaces in the PCB 250 can include a NFC module, a Bluetooth® low energy (BLE) interface, and/or other wireless communication interfaces/antenna modules such as Wi-Fi, cellular (3G, 4G, 5G, LTE, or any combination thereof). An NFC module included on the PCB 250 can enable proximity-based, rapid setup of wireless pairing between the smartwatch 200 to an external device (e.g., a smartphone, tablet, or another computing device with supported NFC capabilities). The NFC module can facilitate the automatic launching of one or more applications associated with the external device when the external device's NFC antenna is positioned in close proximity to the NFC module of the smartwatch 200.

In some implementations, PCB 250 is connected to at least three electrodes. A first electrode is positioned on one sidewall of the housing 210 (FIG. 2) as a lateral dry contact electrode. A second electrode may be another dry contact electrode 262, which is positioned on the bottom of the smartwatch 200 surrounding the sensor window 260 (FIG. 4). The second electrode and the sensor window may protrude from the bottom surface 264 of the smartwatch 200 to the same height, given that both elements remain in contact with the wrist of the user while the smartwatch 200 is worn. In some implementations, the sensor window would be a transparent or translucent contact electrode simplifying the layout of sensors on the bottom of the electronic device. The third electrode that connects to the PCB 250 is part of the electrode touch display (e.g., of the lateral interface 220 in the other sidewall of the housing 210, or of the top interface 230).

In one example, the lateral interface 220 on the first sidewall is configured as an electrode touch display 110, and the lateral interface 220 on the second sidewall opposite to the first sidewall is configured as an electrode (e.g., the electrode contact 172 in FIG. 1). Alternatively, in some implementations, the top interface 230 of the smartwatch 200 is configured as an electrode (e.g., the electrode contact 118). The lateral interface 220 on the first sidewall is configured as an electrode touch display 110, and the lateral interface 220 on the second sidewall opposite to the first sidewall is configured as an additional electrode touch display (e.g., the same as, or similar to, the electrode touch display 110). When adorned on the wrist (e.g., FIG. 9) of the user, the base electrode ring 262 (FIG. 4) is in contact with the wrist of the user to provide a first contact location with the user. When the user touches the top interface 230 and/or the lateral interface 220 with a finger from the opposite hand to the hand in which the smartwatch is adorned, the top interface 230 and/or the lateral interface 220 can provide another contact location with the user, thus forming a complete ECG signal circuit for obtaining lead I ECG readings. When a user touches the top interface 230 with one finger and the lateral interface 220 with another finger of the same hand, EDA recordings can be made. Therefore, the PCB 250 may incorporate the ECG/EDA AFE 130 (FIG. 1), such as an analog front-end for EDA and ECG.

In some implementations, a connector (e.g., the connector 232) is used to couple a PCB (e.g., the PCB 120 of the system 100) in the lateral interface 220 to the PCB 250 of the smartwatch 200, and facilitate the PCB 250 of the smartwatch 200 in controlling the input/output functionality of the lateral interface 220. The electrode touch display 110 of the smartwatch 200 can sense touch signals (e.g., from the user's finger), recognize fingerprints, collect skin electric signals (e.g., EDA, ECG, bioimpedance), measure heart rate (e.g., through IR sensors, a microphone, an optical sensor, a camera, etc.), and/or display information related to the functioning of the smartwatch 200 (e.g., battery status/fuel gauge, sensor status, device status, wireless connectivity status, or any combination thereof). Other information, such as health parameters, navigation directions/arrows, notifications, and/or alarms, can also be displayed on the smartwatch 200 (e.g., via the top interface 230 and/or the lateral interface 220).

Referring now to FIG. 4, in some implementations, the smartwatch 200 module further includes a bottom portion 218, in which one or more sensor windows 260 and/or contact sensors 150 interface with the skin of the user. The shape of the sensor window 260 depends on the specific arrangement of the sensors on the bottom side of the PCB 250. In the example shown in FIG. 4, the sensor window 260 is round, although it can also have a square, rectangle, octagon, oval, or any other shape. The sensor window 260 can be made of a transparent or translucent material including plastic, sapphire crystals, mineral crystals, plexiglass, hesalite crystals, glass, or any combination thereof. In some implementations, the sensor window 260 has a flat surface, where non-contact sensors record physiological signals. In some implementations, sensor window 260 can integrate lenses to amplify acquisition of sensor data and/or emission of signals.

The sensor window 260 can allow sensors within the smartwatch 200 (e.g., the other biometric sensors 150 in FIG. 1) to have a closer contact with the skin of the user and protect electronic components within the smartwatch 200. In some implementations, the sensor window 260 is manufactured with transparent or translucent electrode conductive material. In some implementations, the sensor window 260 conducts the current from the skin of the wrist and serves as an electrode for biometric measurements, such as ECG or bioimpedance. For the sensor window 260 to be transparent/translucent and/or conductive, the material for fabrication can be translucid conducting oxides, carbon nanotubes or nanowire networks, polymers, or any combination thereof. In some implementations, the housing window could be manufactured out of clear/opaque conductive materials allowing optical and other sensors to make non-contact recordings. The window surface opening could be covered by a transparent protective material that is dirt repellent and waterproof to protect the sensors. In alternative embodiments, there could be multiple sensor windows of different shapes, sizes, and arrangements on the bottom surface of the smartwatch, allowing for different non-contact sensors within the smartwatch housing to capture measurements from the skin of the user.

As described herein, in some implementations, the outer circular ring 262 indicates the location of the base electrode in the bottom of the smartwatch 200. The electrode associated with the base ring 262 protrudes from the bottom surface 264 of the smartwatch 200 with the same height as the sensor window 260 to be in the same plane as the skin on the wrist of the user. The base ring 262 is connected to the analog front-end (AFE) (e.g., the ECG/EDA AFE 154) of the ECG sensor (e.g. the ECG sensor 152) in the PCB 250 of the smartwatch 200. The electrode of the base ring 262 remains in contact with the wrist of the user when the smartwatch strap 290 (FIG. 9) is attached to the wrist. In contact with the skin of the user, the base ring 262 may be used, in combination with the top interface 230 and/or the lateral interface 220, for lead I ECG recordings.

In some implementations, the bottom portion 218 of the smartwatch 200 includes at least one coupling element 266. The intermediate ring depicted in FIG. 4 represents the coupling element 266 embedded on the bottom of the smartwatch 200. The coupling element 266 can be a magnet for coupling the smartwatch 200 to a surface (e.g., the surface of a charger). In some implementations, the coupling element 266 is not visible to the human eye, and/or includes materials that can be magnetized either permanently or temporarily (e.g., metal). In some implementations, the magnetized member can be used for wireless inductive charging of the battery inside the enclosure. For inductive wireless charging, the magnetized coupling element may be connected to the PCB that manages the power unit.

Figure 5:
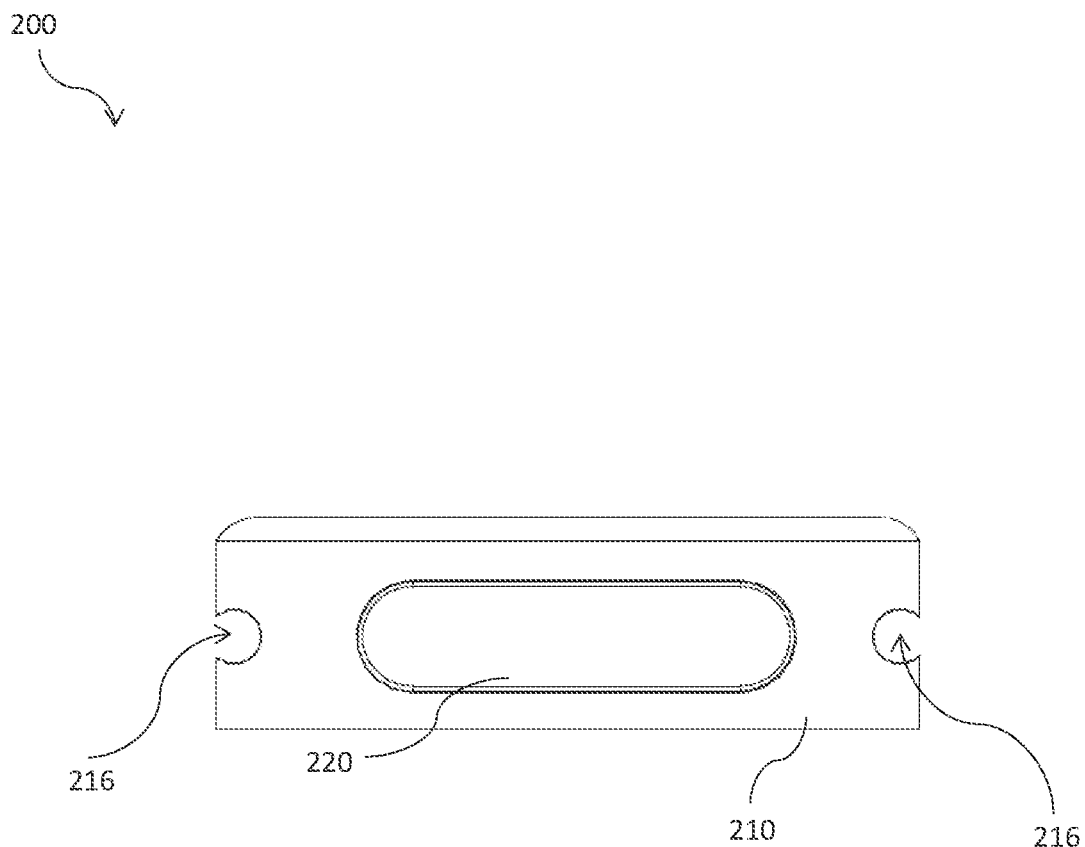
FIG. 5 illustrates a side view of the smartwatch of FIG. 2, according to some implementations of the present disclosure.

FIG. 5 illustrates a side view of the smartwatch 200 of FIG. 2, and shows the lateral electrode touch display in the lateral portion 214 of the smartwatch 200. In this example, an electrode touch display 110 (FIG. 1) is incorporated in the lateral electrode touch display of the smartwatch 200. In some implementations, another side electrode contact is provided on the exterior of the opposite sidewall (not shown) across from the shown sidewall of FIG. 5 (i.e., opposite the shown lateral interface 220). In some implementations, when the smartwatch 200 is in audio output mode, the electrode touch display 110 can automatically function as a volume regulator interface. The electrode touch display 110 may replace unnecessary buttons on the lateral portion 214 of the smartwatch 200.

In some implementations, the electrode touch display 110 (FIG. 1) may be implemented on a lateral wall of a smartphone. The electrode touch display 110 may be used for visual notifications, fingerprint scanning, physiological sensing, user interface input/control (e.g., sound volume regulation), or any combination thereof. Moreover, the implementation of an electrode touch display 110 on one lateral wall of the smartphone and an electrode contact surface on the opposite lateral wall of the smartphone can enable EDA, ECG, bioimpedance, pulse oximetry, and other physiological recordings. Besides a smartwatch 200, smartphone, or tablet, the electrode touch display 110 could be integrated into any wearable device alone or complemented by other sensors. For example, in some implementations, the electrode touch display 110 may be integrated in the keyboard of a laptop for user identification/authentication via fingerprint scanning, touch interface, and/or display of quick access to commands.

Biometric Electrode Touch Display Components

Figure 6:
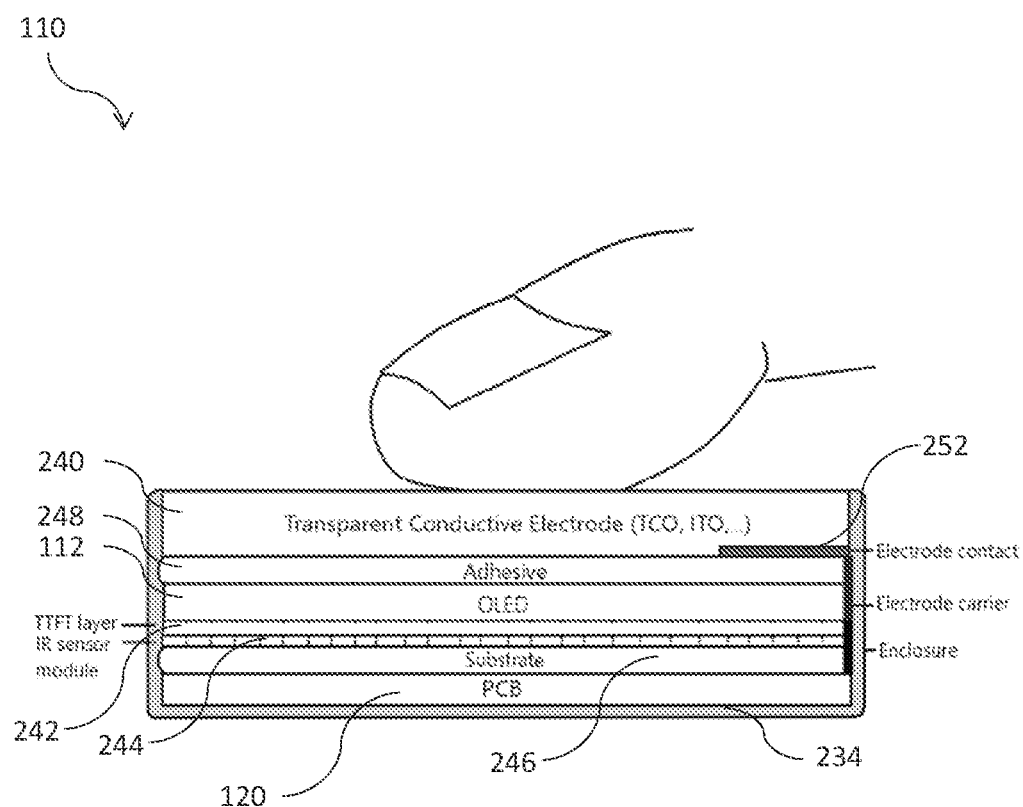
FIG. 6 illustrates a schematic sectional view of an electrode touch display having at least a portion of the system of FIG. 1, according to some implementations of the present disclosure.

FIG. 6 illustrates a sectional view of the electrode touch display 110 (FIG. 1), which may be integrated in the top interface 230 and/or the lateral interface 220. As described herein, in some implementations, the electrode touch display 110 includes the OLED display 112. In some implementations, the OLED display 112 may be coupled to and/or include a transparent conductive screen 240 (e.g., a transparent conductive film, a layer of transparent conducting oxide, conductive polymers, metal grids and random metallic networks, carbon nanotubes, graphene, nanowire meshes, ultra thin metal film, or any combination thereof).

Additionally or alternatively, in some implementations, the OLED display 112 may be coupled to and/or include a touch sensor layer. Additionally or alternatively, in some implementations, the OLED display 112 may be coupled to and/or include optical touch sensors and/or IR emitters. To form an integrated OLED display and touch panel, the touch sensor layer may be positioned below the OLED display 112. For example, as shown in FIG. 6, the OLED display 112 may be coupled to a transparent thin-film transistor (TTFT) layer 242, and one or more IR sensors 244 underneath the TTFT layer 242. Alternatively, the touch sensor layer can be positioned above the OLED display when the components of the touch sensor layer are transparent. In some implementations, the touch sensor layer can be integrated in the OLED emitting layer with shared or separated circuitry.

In some implementations, some layers of the touch panel can also serve as layers of the display, and some of the touch sensor circuitry can be shared with some of the display circuitry. The entire electrode touch display 110 can require multiple separate layers for the transparent electrode 240, IR sensors 244, OLED circuitry, display pixels, and a dedicated PCB (e.g., the PCB 120 of FIG. 1). Multi-touch functionality may be added to the OLED display 112 without the need of a separate multi-touch panel or layer overlaying the OLED display 112.

In some implementations, the PCB module 120 of the electrode touch display 110 lays on the bottom of the enclosure 234. A protective and/or insulating opaque substrate 246 separates the IR sensors 244 from the first PCB module 120 and serves as the backing layer for the OLED display. The opaque and insulating layer protects the optic sensors and display from reflections from the PCB 120 at the same time as it absorbs the reflected light that might pass through the IR touch sensor layer. The IR sensors 244 may be a part of the OLED display and touch interface stack, in which the TTFT layer 242 operates the pixels in the encapsulated OLED display 112. Between the display layers and the transparent conductive screen 240, a transparent adhesive 248 ensures the integrity of the structure without reducing the optical transmissivity. An electrode contact 252 is included between at least a portion of the transparent conductive screen 240 and the corresponding portion of the adhesive 248 to facilitate conductivity of the biometric signal measured to the PCB. The top layer, the transparent conductive screen 240, is held on the sides by the enclosure 234 and is exposed on its upper surface.

Transparent Electrode Screen

Transparent electrodes provide the unique capability for enabling the simultaneous optical and electrical interrogation of biological systems. Some materials used for transparent electrodes have the characteristics of absorbing electromagnetic radiation and protecting the users of a screen. The materials used for transparent electrodes range from optimized transparent conductive oxides (TCOs), to electrodes made from nano and 2D materials (e.g., metal nanowire networks and graphene), to hybrid electrodes that integrate TCOs or dielectrics with nanowires, metal grids, or ultrathin metal films. The transparent electrodes that include metallic nanowires have a polymeric overcoat layer for protecting the nanowires from corrosion and abrasion.

Indium tin oxide (ITO) and metal grid (MG) hybrid structures may be used to achieve high optical transmittance (60-90%), superior electrochemical impedance (5.4-18.4 $\Omega cm2$), and excellent sheet resistance (5.6-14.1 $\Omega sq-1$). The capabilities of the ITO/MG transparent electrodes provide for high-fidelity electrical recordings and optical transmittance. Other material that could be used include silver nanowire (AgNW)/graphene oxide (GO); a hybrid transparent conductive screen can be fabricated with AgNWs and GO by employing screen-printing technology for the fabrication. By encapsulating the AgNW with the GO layer, the electrodes exhibit excellent optical and electrical properties (transmittance of 83.5% at 550 nm and sheet resistance of 11.9 Ohm/sq). Apart from optical and electrical properties, the AgNWs/GO hybrid material presents high reliability, biocompatibility and long-term stability. These or other materials may be used to manufacture the transparent electrode screen 240 that is placed on the surface layer of the electrode touch display 110 (FIG. 6).

Figure 7:
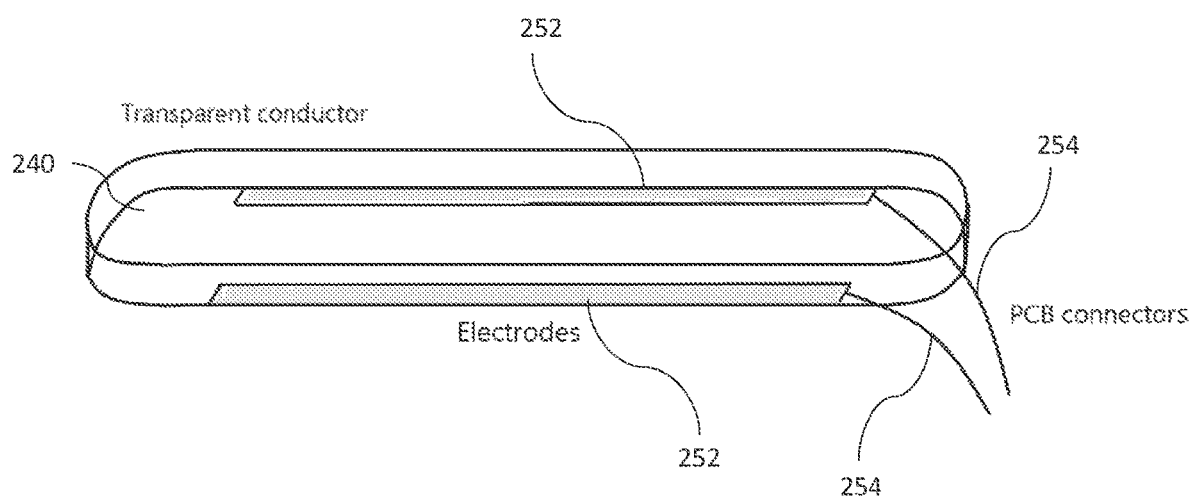
FIG. 7 is a schematic view of transparent electrode carriers and printed circuit board (PCB) connectors of the electrode touch display of FIG. 2, according to some implementations of the present disclosure.

FIG. 7 illustrates a schematic view of transparent electrode carriers and PCB connectors of the electrode touch display 110 of FIG. 6. As shown in FIG. 7, the transparent conductive screen 240 can include a pair of electrode contacts 252 attached to the bottom surface of the conductive screen 240. The electrode contacts 252 can be made of copper, silver, or any other conductive material. In some implementations, the electrode contacts can be transparent or translucent. In some implementations, one or more electrode contacts can be used instead of the illustrated pair of contacts 252 in FIG. 7. The thin and narrow electrode contacts 252 are attached to both laterals of the transparent screen bottom surface for collecting and connecting with the external circuit of the PCB through the PCB connectors 254. In some implementations, different shapes and sizes of electrode contacts can be used to measure biopotential metrics from the user in contact with the transparent conductor. In some implementations, the PCB connectors 254 of FIG. 7 are the same, or similar to, the PCB connectors 232 of FIG. 3. The ECG and EDA signal processing circuit in the PCB is composed of amplifiers, a high-pass filter, a low-pass filter, a level-up circuit, or any combination thereof. As part of the stack structure from FIG. 6, the transparent electrode screen 240 is attached through transparent adhesive 248 and laterally enclosed within the enclosure 234 of the electrode touch display 110 (FIG. 6).

Figure 8:
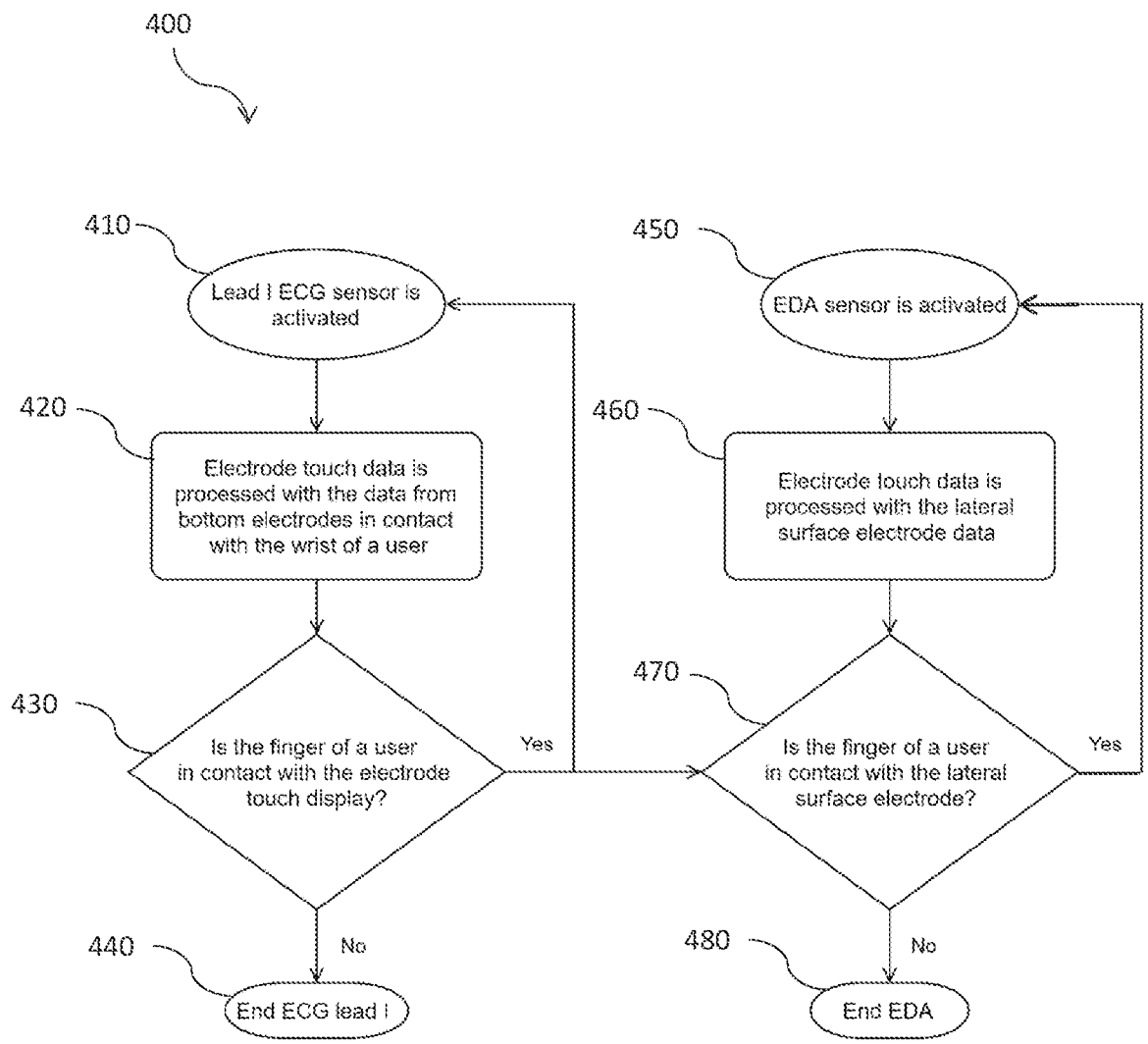
FIG. 8 is a flow diagram of ECG and EDA screen electrode acquisition, according to some implementations of the present disclosure.

Together with the side electrode contact, the electrode touch display 110 can be used to perform both ECG and EDA readings depending on the disposition of one or multiple fingers of the hand of a user. FIG. 8 illustrates a flow diagram of the ECG and EDA screen electrode acquisition method 400 using the system 100 and/or the smartwatch 200 described herein.

When lead I ECG sensor is activated at step 410, the method 400 proceeds to step 420, where electrode touch data is processed with the data from the bottom electrodes in contact with the wrist of a user. At step 430, the method determines whether the finger of the user is in contact with the electrode touch display (e.g., the top interface 230 or the lateral interface 220 of the smartwatch 200). If the finger of the user is in contact with the electrode touch display, lead I ECG sensor is continually activated at step 410, and electrode touch data is continually processed with the data from the bottom electrodes in contact with the wrist of the user at step 420. If the finger of the user is no longer in contact with the electrode touch display, the ECG lead I measurements are complete and end at step 440.

Further, if the finger of the user is in contact with the electrode touch display, the method 400 also proceeds to step 470 to determine whether another finger of the user is in contact with a lateral surface electrode (e.g., another lateral interface 220 of the smartwatch 200). If another finger of the user is in contact with the lateral surface electrode (e.g., coupled to either lateral interface 220 of the smartwatch 200 in FIG. 3), EDA sensor is continually activated at step 450, and electrode touch data is continually processed with the lateral surface electrode data at step 460. If another finger of the user is no longer in contact with the lateral surface electrode, the EDA measurements are complete and end at step 480.

ECG Monitoring

One of the most important physiological signals for health monitoring is electrocardiography (ECG). The electrocardiogram indicates the change in the magnitude of the cardiac vector and can be used for investigating the electrical activity of heart and early diagnosis of heart disease. ECG can be used to detect atrial fibrillation, which is an irregular or accelerated heart rate, and can lead to strokes or heart failure.

Figure 9:
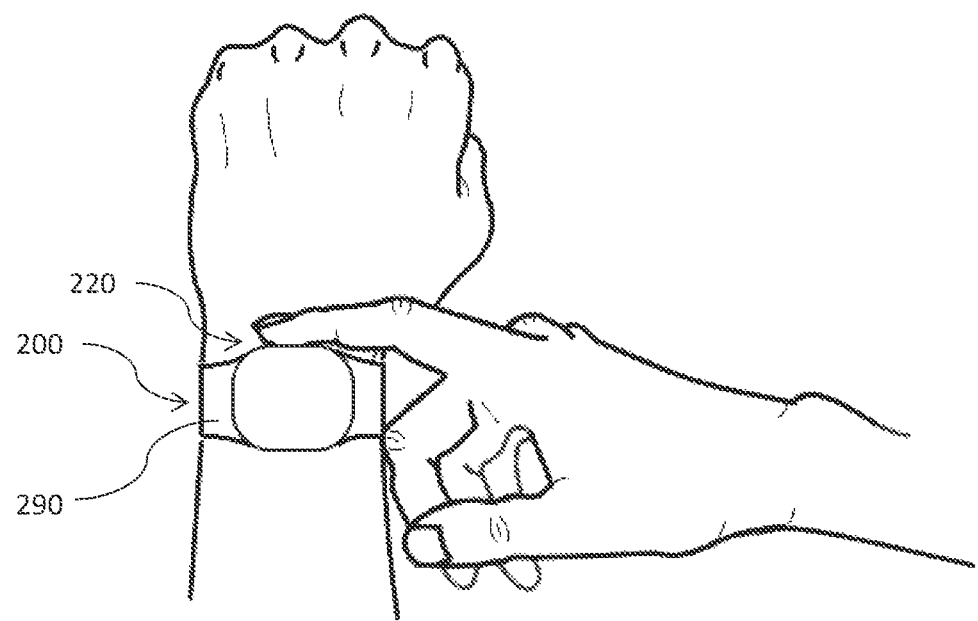
FIG. 9 illustrates the finger position in contact with the electrode touch display of the smartwatch of FIG. 2 for ECG monitoring, according to some implementations of the present disclosure.

FIG. 9 illustrates an example of the finger position in contact with the electrode touch display on the lateral interface 220 of the smartwatch 200 for ECG monitoring. In this example, the electrode touch display 110 (FIGS. 6-7) is integrated on at least one sidewall of the smartwatch 200. In some implementations, the smartwatch has an electrode touch display 110 on both opposite sidewalls. In some implementations, the smartwatch has an electrode touch display 110 on one sidewall (e.g., as a part of the lateral interface 220), and the opposite sidewall has an electrode (e.g., the opposite lateral interface 220 includes a dry contact electrode) but no electrode touch display 110.

The transparent electrode screen 240 on the electrode touch display 110 (FIG. 6) integrated in a smartwatch 200 or another electronic device can be used to acquire ECG signal. FIG. 9 shows the position of the user's finger on the smartwatch 200 to record a lead I ECG signal. ECG monitoring is performed when placing the pad of the index or other finger on one of the lateral electrodes (of or outside of the electrode touch display 110), with light to moderate pressure. To complete the circuit, another dry electrode is placed on the bottom of the smartwatch 200 (FIG. 4), in contact with the wrist of the opposite hand of the user. Biometric information from ECG can be complementary to the biometric information in the fingerprint, as these data come from different sources. Thus, ECG data can be used in conjunction with fingerprint biometrics in order to further enhance device/application security. More importantly, the ECG-based biometric would improve the robustness of fingerprint biometrics against spoofing attacks (e.g., testing for liveness).

Bioimpedance Monitoring

Another important physiological signal enabled with the lateral electrode contacts on the smartwatch 200 is the EDA. The electrodermal activity is a short-term variation of the electrical resistance of the skin, caused by the typical increase of the sympathetic tone in emotional-affective reactions. This leads to an increased sweat secretion, corresponding to an increase in skin conductivity. The EDA sensor can measure galvanic skin response or skin potential, resistance, and/or conductance by passing a small amount of current through the skin of the user. The EDA sensor can be used to monitor stress level patterns or level of neural and physical activity as well as skin moisture among other possible indicators. EDA can be measured between two fingertips of one hand. These locations are chosen because of the high density of sweat glands. In some implementations, in order to monitor the EDA, two fingers of the same hand have to be in contact with each lateral electrode.

Figure 10:
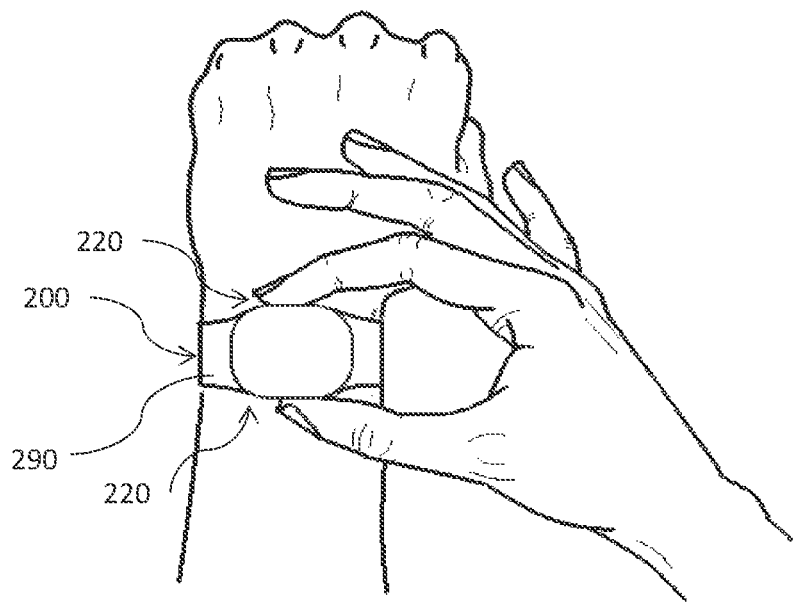
FIG. 10 illustrates the finger positions in contact with both side electrodes of the smartwatch of FIG. 2 for EDA monitoring, according to some implementations of the present disclosure.

FIG. 10 illustrates example finger positions in contact with both lateral electrodes on both sidewalls of the smartwatch 200 to enable EDA monitoring. The gripping position of the user's hand is illustrated, which allows EDA recording using the smartwatch 200. Both lateral electrodes provide a large contact surface, and the higher contact surface significantly reduces the measurement artifacts. To make an EDA recording, the user has to place one finger on each lateral electrode of the smartwatch 200 and wait for a few seconds. After that, the smartwatch 200 can also ask for the user's mood or input of any physiological symptoms, and will then process the EDA values along with other health parameters recorded in the smartwatch 200. Some external factors that influence the EDA response are temperature and humidity. The temperature and/or humidity may be recorded in contact with the skin of the user on the bottom of the smartwatch 200, and are used to calibrate the EDA signals and avoid inconclusive results.

In some implementations, the lateral electrode disposed in one of the side walls of the smartwatch 200 in contact with a finger from the user and the electrode on the bottom of the smartwatch in contact with the wrist of the other arm of the user, could be used for bipolar bioimpedance monitoring. Bioimpedance enables unobtrusive estimation of body composition and hydration. A similar position to FIG. 9, where the wrist of one hand and the index finger of the opposite hand are the skin contact points with the electrodes of the smartwatch 200 would be an optimal contact for impedance analysis. Bipolar bioimpedance measurement consists of using two electrodes to generate a small current, which is AC and constant current between these. With a bipolar arrangement (e.g., having two electrodes configured to contact two different points on the skin), the same pair of electrodes function to both supply the constant current, which is often referred to as the excitation current, as well as to detect and/or determine the impedance that the segment imposes on the excitation signal. The body composition, along with the percentage of body fat and water, can be extracted using upper-body impedance values and anthropometric data. In other cases, the bioimpedance signal can be used to measure other health metrics such as the blood pressure, respiration signal, and blood glucose.

In some implementations, the system or device of the present disclosure can include more than two electrodes. In order to achieve the highest accuracy for bioimpedance measurements, two electrodes on the bottom of the smartwatch and on the sidewalls are required to separate the current injection and voltage sensing. This electrode arrangement is named tetrapolar bioimpedance configuration. In some cases, the electrode ring positioned on the bottom of the device can be divided into two equal parts for bioimpedance monitoring. For a tetrapolar configuration the user would reproduce the gripping position of FIG. 10. In this case, one of the electrodes on the bottom of the smartwatch 200 and another electrode from the sidewall would inject the current for bioimpedance measurements to be recorded between the remaining electrodes (one on the bottom of the smartwatch 200 and another on the opposite sidewall). In some cases, when the electrode touch display has a longer surface than 3.5 cm approximately, the transparent conductive screen could be separated into two electrodes for both EDA and bioimpedance measurements.

OLED Display

Figure 11:
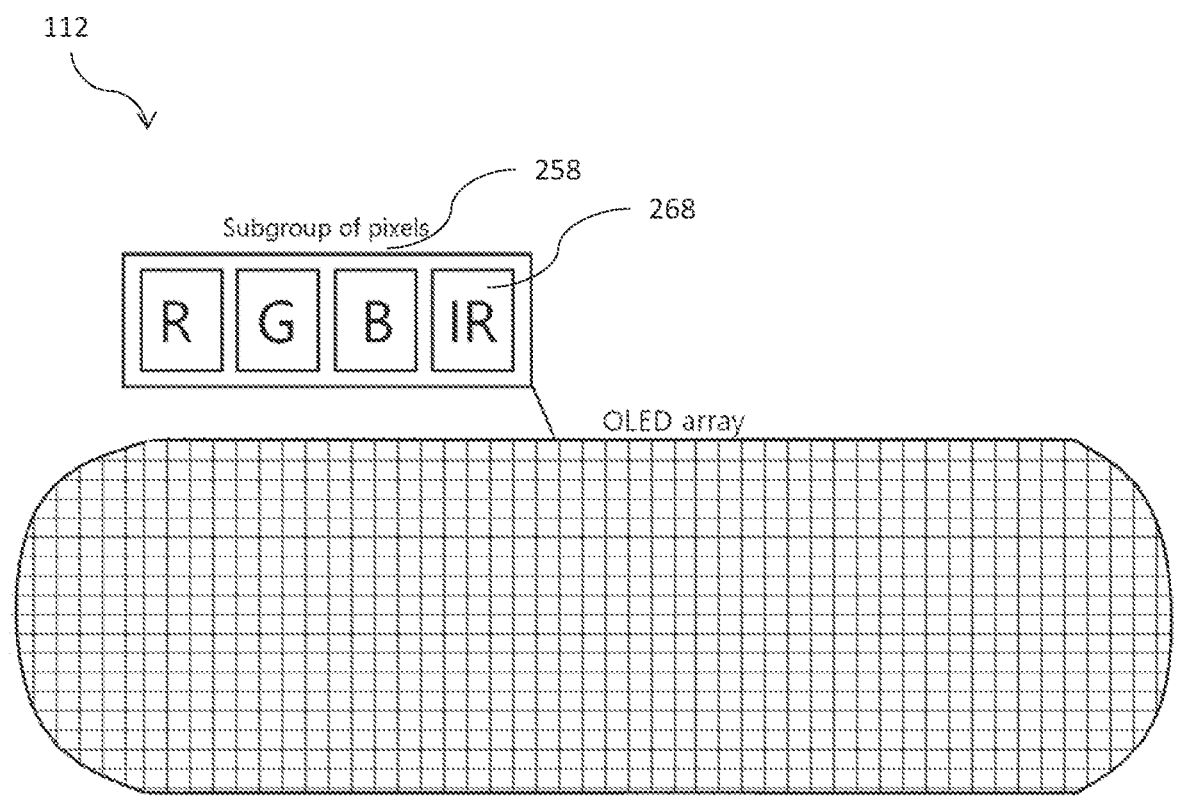
FIG. 11 is a schematic view of an organic light-emitting diode (OLED) array with a respective infrared (IR) emitter disposed with each OLED, according to some implementations of the present disclosure.

In order to reduce the stack size of the electrode touch display 110, the OLED display 112 can integrate IR emitters and a multi-function circuit for both display and touch sensing. FIG. 11 illustrates a schematic view of the OLED display 112 with a respective IR emitter 268 disposed with each OLED. As illustrated in FIG. 11, the IR emitters 268 coupled to the OLED display 112 are configured to serve as an infrared light source for fingerprint imaging. In some implementations, the array of IR sensors 244 (FIG. 6) can be integrated in the same layer as the OLED display 112. Thus, at least a portion of the pixels 258 can each incorporate an IR sensor 244 (FIG. 6) next to the IR emitter 268 (FIG. 11). In that case, a small separation between the IR sensor 244 and the emitter pixel 258 would be required to avoid crosstalk between IR emitters and sensors, which could lead to an improper functioning of the fingerprint and touch interface. Beyond the IR light emission, each emitter pixel 258 in the OLED display also emits green, red, and blue light in all possible combinations of those colors. Consequently, both fingerprint scanning/touch detection and display can happen simultaneously on the same device. In some implementations, additional to or alternative to the IR sensors, the green and/or red LEDs from the OLED display, and the corresponding red and green light sensors, can be used to measure blood glucose level, heart rate, pulse, oxygen saturation, and/or other physiological metrics.

OLED displays can be lighter and thinner than alternative display technologies, such as LCD and LED which have slower response times. OLEDs don't need a backlight since the light can be generated from the OLED material itself. Consequently, OLED displays have a higher contrast ratio and can display more vibrant images consuming less power. Several types of OLEDs can be integrated into the electrode touch display screen. For example, passive-matrix OLEDs (PMOLEDs), active-matrix OLEDs (AMOLEDs), transparent OLEDs and more. In the present configuration, the transparent OLED display enables the sensor array positioned below the display to capture reflected IR light from the finger contacting the screen. In some implementations, an AMOLED display can be implemented when the TTFT layer 242 (FIG. 6) is made of a transparent plastic substrate.

Driving the subpixels in the display there is a layer of TTFTs (e.g., the TTFT layer 242 in FIG. 6). The transistors operate the blue, red, green, and/or infrared subpixels in the display to generate figures and/or present data at the same time as detecting touch positions and/or scanning fingerprints. A display example of the information that can be displayed on the lateral interface 220 is illustrated in FIGS. 12-13.

Figure 12:
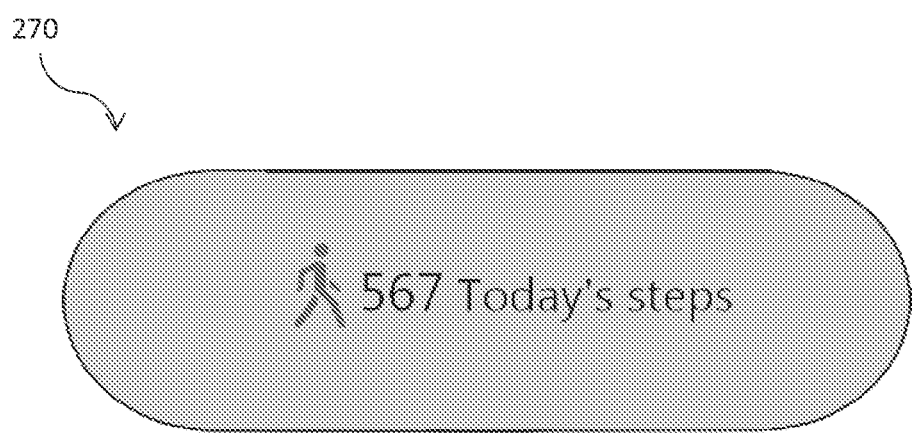
FIG. 12 is an example visual indication displaying health information, according to some implementations of the present disclosure.
Figure 13:
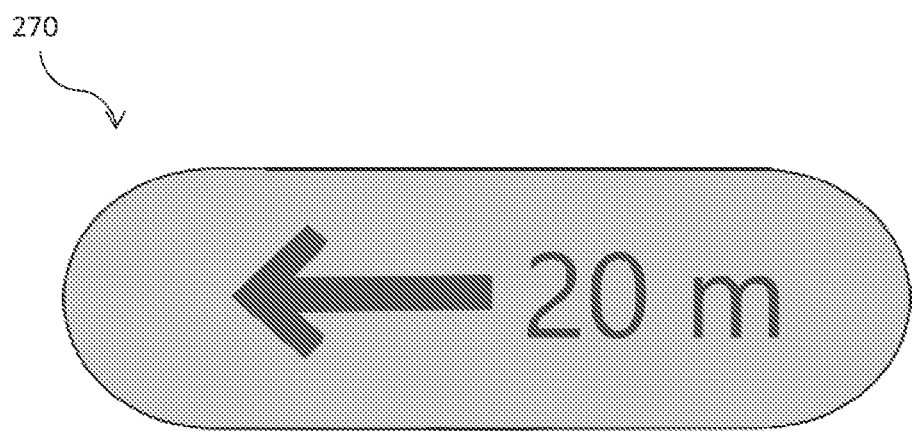
FIG. 13 is an example visual indication displaying navigation directions, according to some implementations of the present disclosure.
Figure 14:
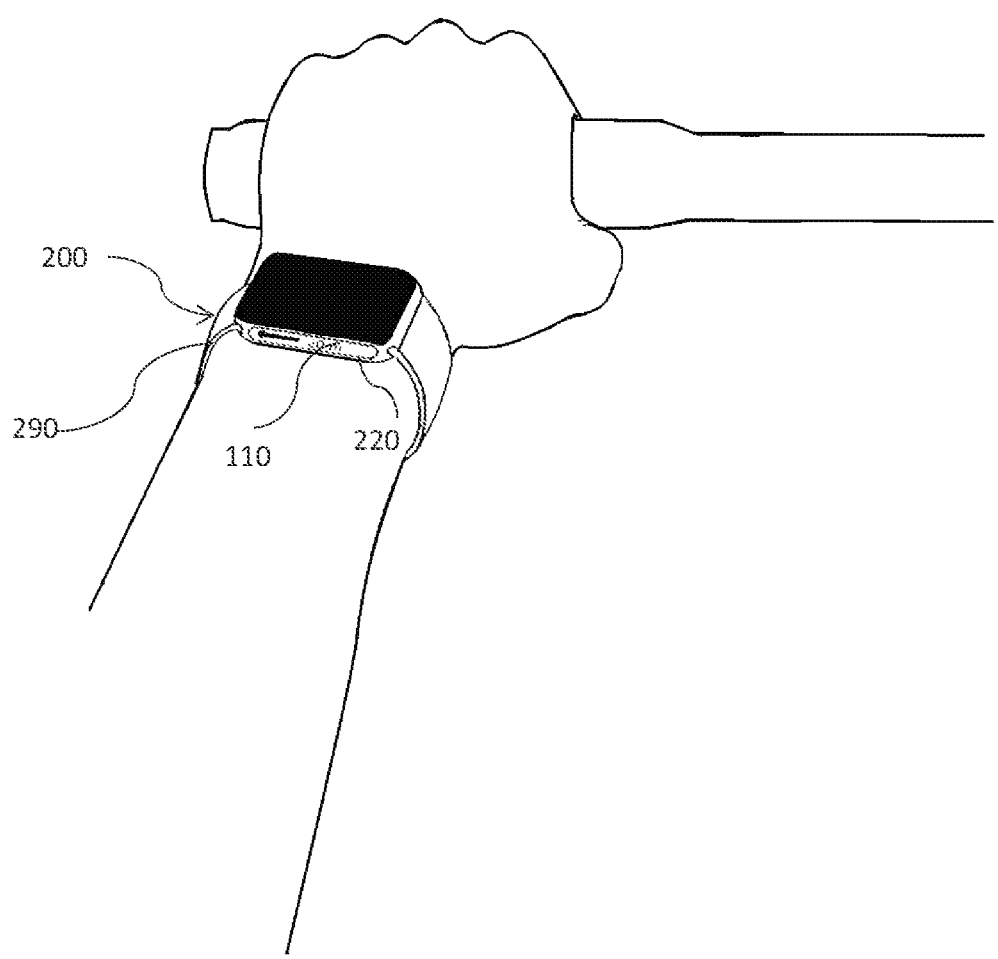
FIG. 14 illustrates a side electrode touch display of the smartwatch of FIG. 2, according to some implementations of the present disclosure.

Referring now to FIGS. 12-13, the electrode touch display can also display a visual indication 270 via, for example, the OLED display. FIG. 12 illustrates an example visual indication 270 displaying health information, showing that the user has taken 567 steps that day. FIG. 13 illustrates another example visual indication 270 displaying navigation directions for the user that is riding a bicycle/motor bike, or pushing a baby stroller. For real time navigation display, the user can wear the smartwatch 200 with the electrode touch display 110 (e.g., integrated in the lateral interface 220) on the arm facing towards the user as shown in FIG. 14. Referring to FIG. 14, which illustrates the electrode touch display 110 on the lateral interface 220 of the smartwatch 200. A visual indication similar to what is shown in FIG. 13 is displayed for a user biking with both hands on the handles.

Referring back to FIG. 3, in some implementations, the electrode touch display 110 (FIG. 1) may be integrated in the top interface 230. Additionally or alternatively, in some implementations, the electrode touch display 110 (FIG. 1) may be integrated in either or both lateral interfaces 220. Additionally or alternatively, in some implementations, the electrode touch display 110 may vary the position of the displayed text, images, and/or symbols to adjust to the physical position of the user. For example, when the arm of the user is detected to be in a horizontal position, the electrode touch display 110 of the top interface 230 can rotate the displayed text and symbols so it can be read by the user. The inertial measurement unit (IMU) can be used to detect the position of the wrist of the user in reference to the position of the user, and rotate the display in the top interface 230 to adjust to the detected position. In some implementations, the IMU can include accelerometers, gyroscopes, magnetometers, or any combination thereof. Data from the accelerometer and the geomagnetic field sensor (e.g., magnetometer) can be used to determine the device's physical position in the world's frame of reference.

Multiresolution IR Touchscreen

The IR based multiresolution screen implements a novel unified technology using transparent electronics for both fingerprint scan and multi-touch interaction. This technology enables both touch interactions and fingerprint scanning once the finger of a user comes in contact with the screen. The best light transmissivity and clarity of a fingerprint image is provided by infrared technology above resistive or capacitive systems. IR touch detectors can recognize interactions on any substrate with high sensitivity and provide a stable calibration even under adverse ambient conditions such as humidity, rain, snow or low temperatures. Moreover, IR touch screens can be interfaced with different objects and materials, which would allow the detection of wet fingers or fingers covered by gloves. In some implementations, the IR sensor matrix could be used for health measurements such as pulse oximetry where the infrared light absorbed by the finger is related to the oxygen level of the circulating blood. In some cases, additional red and/or green light sensors would be added to the IR sensor array in order to utilize the green and red LEDs from the display for pulse oximetry metrics.

Figure 15:
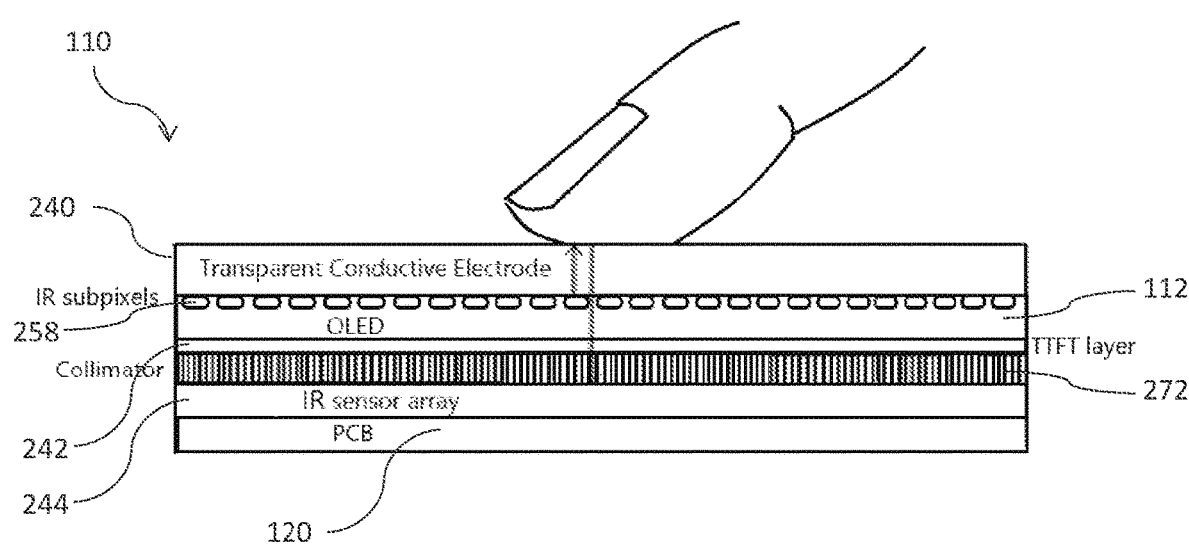
FIG. 15 is a schematic view of the IR based multiresolution touch interface in the electrode touch display of FIG. 2, according to some implementations of the present disclosure.

FIG. 15 is a schematic view of the IR-based multiresolution touch interface in the electrode touch display 110 (FIG. 1). The electrode touch display 110 of FIG. 15 is the same, or similar to, the electrode touch display 110 of FIG. 6, where like reference numerals refer to like elements. The infrared touch screen technology illustrated in FIG. 15 uses IR emitting pixels 258 implemented in the encapsulated OLED display 112 and measures the reflected light through the IR sensor array 244. Before the IR reflected rays reach the IR sensor array 244, a collimator 272 filters out the indirect rays. By positioning the collimator 272 on top of the IR sensor array 244 and below the TFTT layer 242, the stray light beam that is blocked by the inner surface of the collimator 272 has a larger angle than normal, relative to the collimator 272's aperture. Thus, only the straight light that is reflected from the top surface of the transparent conductive screen 240 when the finger is in contact with the transparent conductive screen 240 reaches the IR sensors 244, avoiding the possible scattered rays that could distort the image.

In some implementations, the electrode touch display 110 provides a high-resolution transparent touch sensitive interface with IR sensor arrays 244 that are driven by a read-out circuit. The circuit interconnects IR sensors 244 and enables a switch-based resolution control that drives the sensor array at low resolution for touch interaction and high resolution for fingerprint pattern recognition. Such a multiresolution technology can provide various different applications for consumer electronics, such as supporting various touch interactions or simultaneous identity management. One of the advantages of this technology is providing a more reliable fingerprint reading and enabling fingerprint unlocking from many different locations on the screen. Moreover, the multiple transparent layers providing this technology allow the integration of a display (e.g., OLED, LCD, etc.) Furthermore, the multiresolution screen described herein can be developed through simple circuitry and synchronized controlled commands without time consuming steps to change the resolution of the screen, thereby achieving a simpler UI.

Figure 16:
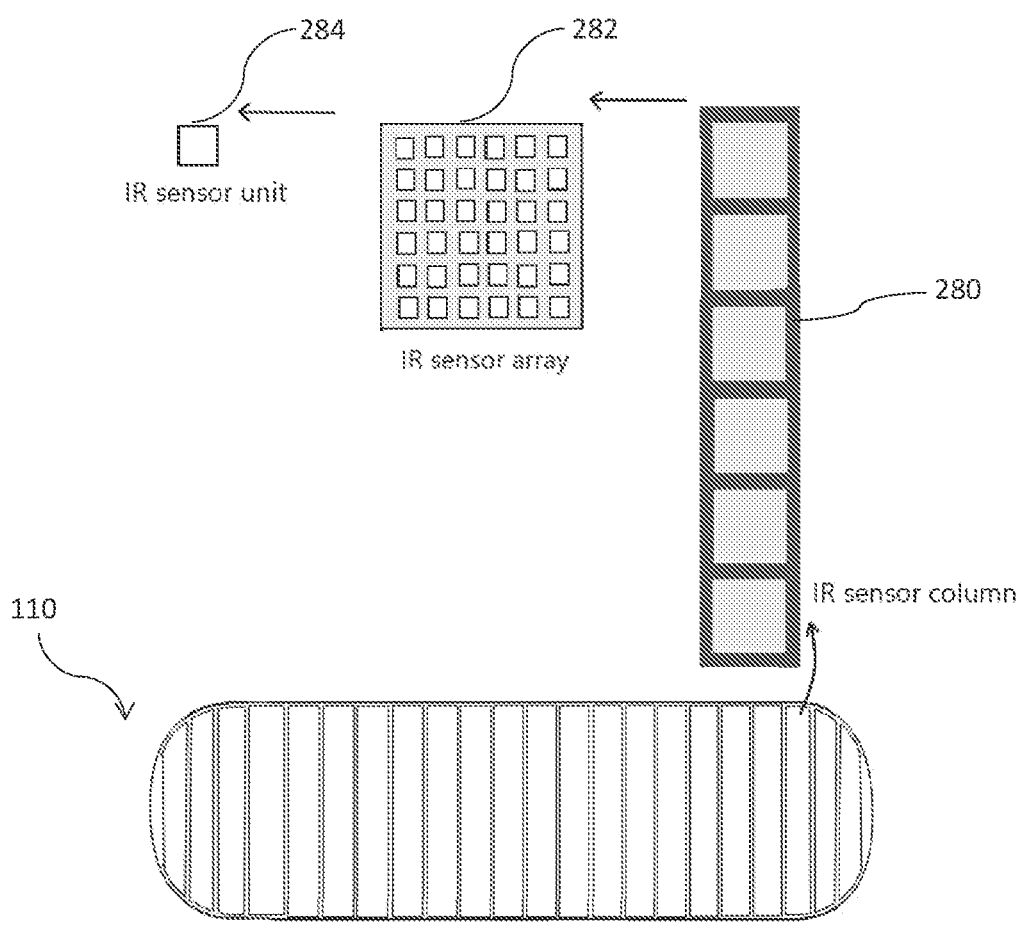
FIG. 16 illustrates the arrangement of IR sensors in array and column units for the multiresolution touch interface of FIG. 15, according to some implementations of the present disclosure.

Referring to FIG. 16, the arrangement of IR sensors in array and column units for the multiresolution touch interface in the electrode touch display 110 is illustrated. IR sensor arrays are arranged in columns as depicted in FIG. 16. The IR sensor columns are used to provide the location of the detected finger at a low-resolution functioning of the touch screen. This multiresolution touch screen works on low resolution most of the time to detect touch interactions in the longitudinal direction and, therefore, operates in an energy efficient manner.

In some implementations, the electrode touch display 110 is positioned in the lateral side of the smartwatch 200 (e.g., included in the lateral interface 220 of FIG. 2), and has a small form factor with an approximate width of a thumb, the distance of the detected finger is only recorded in one dimension along the length of the interface. In some implementations, where the electrode touch display 110 is bigger (e.g., included in the top interface 230 of FIG. 2), a switch-based system may be utilized with the IR sensor arrays that enable touch interactions to be detected in the plane in both vertical and horizontal dimensions. Therefore, the IR sensor array columns 280 can be used in the case of small touch screens that are only required to locate the interaction in one dimension.

As shown, each IR sensor column may include a plurality of IR sensor arrays. For example, the IR sensor column 280 includes six IR sensor arrays 282. However, the IR sensor column of the present disclosure may include more or fewer IR sensor arrays. Each IR sensor array 282 includes 36 IR sensor units 284. However, the IR sensor array of the present disclosure may include more or fewer IR sensor units.

Readout Circuits and Dual Operation Modes

The system of the electrode touch display 110 includes a plurality of IR sensor arrays 282. Each IR sensor array 282 consists of 36 sensor units 284 for detecting the IR light reflected from a finger in contact with the electrode touch display 110, and can be used for both touch detection and fingerprint scan. The IR sensor units 284 are arranged into a 6×6 square array with a differentiation of a central cluster, with four IR sensor units 284, and a peripheral cluster with 32 IR sensor units 284.

Figure 17:
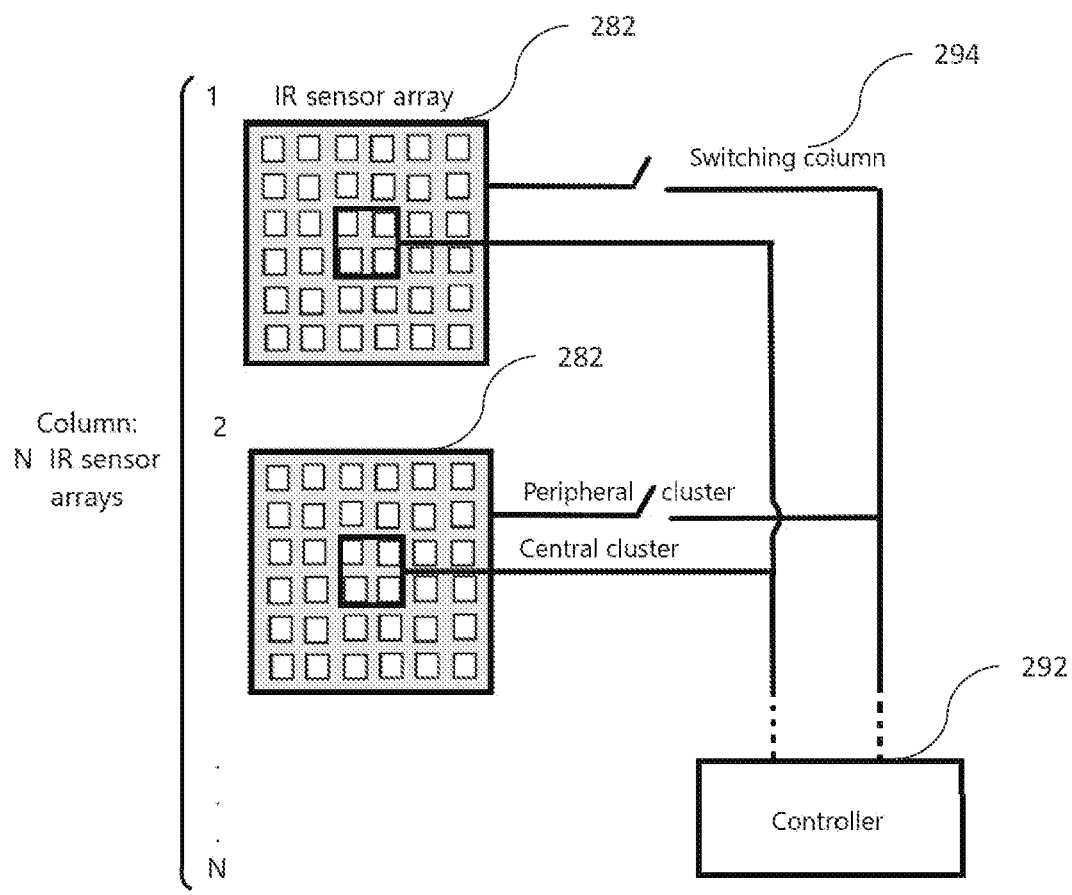
FIG. 17 illustrates a schematic of the circuit of the switching columns that operate the resolution of the multiresolution touch interface of FIG. 15, according to some implementations of the present disclosure.

FIG. 17 illustrates a schematic of the circuit of the switching columns that operate the resolution of the multiresolution touch interface in the electrode touch display 110. As shown, the IR sensor arrays 282 are grouped into columns enabling central and peripheral driving circuits to control the clustered IR sensor units, and connect their signal to the processing circuit. Each infrared sensing pixel receives infrared radiation naturally emitted by the subdermal features of the finger of a user. The IR sensor array 282 outputs the signals from the IR sensor units to the connected data lines in the read-out circuit, which is connected to a processor (e.g., the processor 122 of the system 100) that generates biometric patterns from the data of the infrared sensing pixels. The signal processing circuit amplifies the sensed signal, converts the analog ridge/valley output into digital data, and stores them in latches. Instead of going through an energy intensive ADC, the outputs go through parallel analog comparators. These components compare the input of voltage related to the IR light intensity signal with a reference voltage to assess the touching surface and convert it into digital values. In some implementations, the reference voltage from the IR intensity signal varies depending on the ambient conditions. As such, the system of the present disclosure may adjust the reference voltage accordingly. The comparators achieve fast scanning speeds compared with other conventional controller-based algorithms.

The system can include a switching column 294 connected to each cluster. One or more clusters can be coupled through a switch. By coupling multiple switches together, the IR sensor column can dynamically have more or less resolution through the controller 292. For example, when the system is detecting fingerprint patterns at high resolution, both switching columns from the central and peripheral clusters are closed so that readings from every pixel are being recorded. In other scenarios where only touch location is required, the peripheral switching columns are disconnected from the signal acquisition circuit along with a differentiated operation process.

Each group of columns has its own switching circuit. When the peripheral clusters are disconnected in one column, nearby columns have the peripheral IR sensor units also disengaged, simplifying the sensor readings for touch detection. The column driver consists of a multiresolution switch circuitry as shown in FIG. 7. A column decoder can decode the given column address and store the active IR sensor unit data in the register of that address. In touch mode, the switch columns of the peripheral cluster are open, which indicates that only the central cluster pixels are retrieving information. That information is then saved in the column register and processed with amplifying, averaging and threshold-based algorithms to indicate whether a finger is interfacing the electronic device at that horizontal position.

For fingerprint detection, the switching columns are connected for both clusters and the information from each column is split into independent sensor arrays 282. Each sensor array 282 is connected to a readout circuit that decodes the information from every IR sensor unit 284 and registers the direction of the sensor unit 284 so that, when the data is being processed, each ridge/valley digit has an exact vertical and horizontal location that enables the reconstruction of a fingerprint image. For fingerprint scanning, the IR sensor units will be sampled at the maximum resolution which indicates that all IR sensor units in a column are connected. However, not all columns perform high resolution readings at the same time. Given a recorded and stable touch location and an average fingerprint size of 18 mm, only the columns surrounding the finger touch location would record the fingerprint image with a high-resolution setting. This is achieved by sending the column scan address to the controller unit. The sensing system can select column's outputs stored in the latches surrounding the touch location.

Touch Screen Interface

During the touch screen mode, the IR sensor columns horizontally locate the finger on screen interaction. Each column has its own latch for storing the output from the central cluster of the IR sensor arrays which sums up the IR light intensity values. For each IR sensor array 282, a multiplexer can be used to select which latch should receive the converted digital output of a column. For touch detection, the sensing system outputs a pattern image with reduced resolution from which the touch location can be determined. The touch screen interface enables different horizontal interactions such as sliding (e.g., for volume control, for answering a phone call, for swiping in apps), tapping (e.g., to lock the top interface), multi touch (e.g., to zoom in or out on the top interface, a combination of tapping and sliding, or any other combination of gestures), touch and hold (e.g., for app selection). In some implementations, more than one interaction can be simultaneously recorded and utilized as an input mechanism for certain applications.

Figure 18:
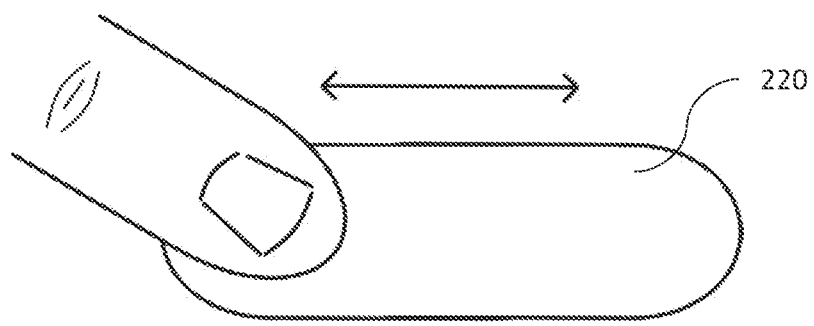
FIG. 18 is a schematic view of the horizontal finger interaction with the side electrode touch display of FIG. 14, according to some implementations of the present disclosure.

FIG. 18 is a schematic view of the horizontal finger interacting with the touch sensor of the electrode touch display integrated in the lateral interface 220 of the smartwatch 200 (FIG. 2). In order to detect the contact position of the finger in the lateral interface 220, the reflected IR signal measured remains stable during a period of milliseconds, so the touch recording is valid. In some implementations, the calibrated signal is within a minimum fingerprint size of 90 mm$^2$. As a consequence, the measured finger locations are identified as valid when the IR light reflected is evenly distributed through the finger touch location with a minimum and maximum width constraint. If the recorded signal is uneven, under a set threshold, too wide, or too narrow, the touch recorded would be classified as invalid, and a new entry would be required to interface with the electronic device (e.g., the smartwatch 200).

Figure 19:
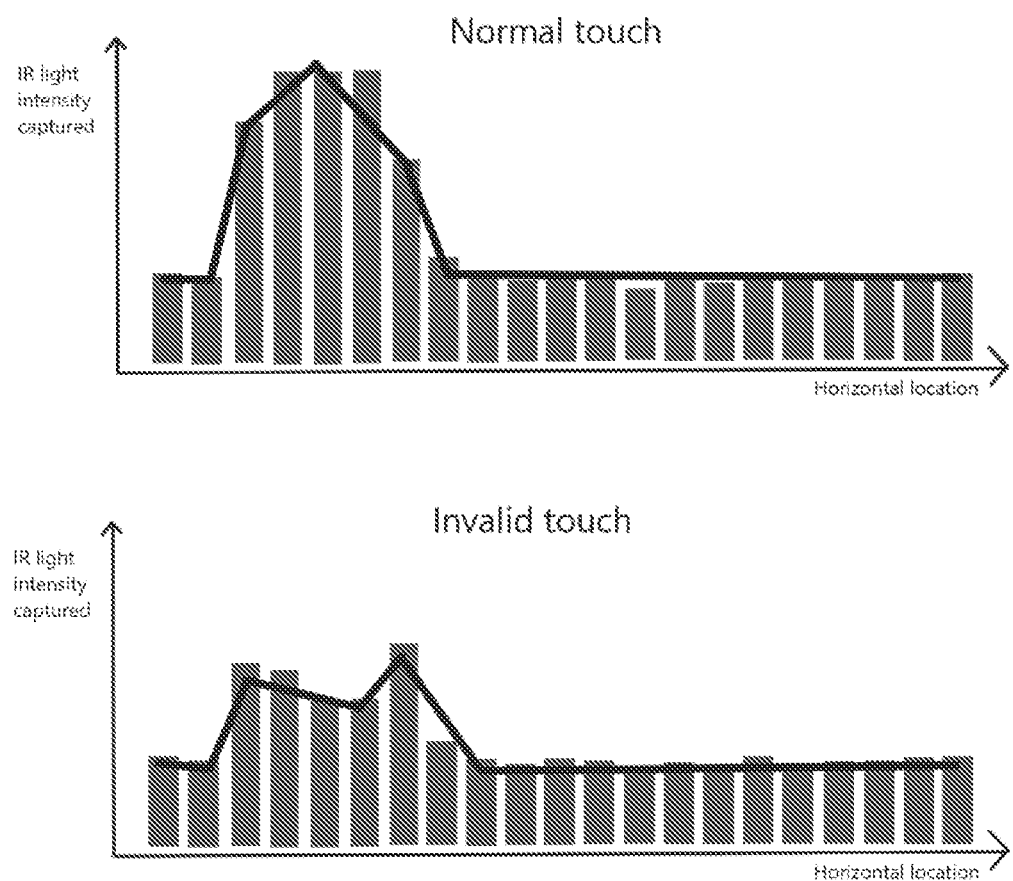
FIG. 19 illustrates IR sensor column readings showing the horizontal location of a detected finger on screen, according to some implementations of the present disclosure.

FIG. 19 illustrates IR sensor column readings with regards to the IR light intensity captures, showing the horizontal location of a detected finger on the screen (e.g., the lateral interface 220 of the smartwatch 200 in FIG. 2). The upper portion of FIG. 19 shows the IR light intensity captured across the columns during a normal touch. The lower portion of FIG. 19 shows an example of the distribution of the column readings of the IR light intensity captured across the columns during an invalid touch. In some implementations, valid and invalid touch readings are calibrated with a minimum finger size and/or stability of the signal.

Fingerprint Sensor

Authentication is one of the primary means to gain access to secure systems. In some implementations, wearable device users need to be authenticated in order to gain access to the device, applications, services, health data, or personal information contained within the device. In this way, medical data and other sensitive user information is protected from possible intruders while providing secure and easy access for the permitted user. In order to implement a secure system in the smartwatch 200 or other electronic device, the multiresolution touch interface can use its high-resolution sensing capability to work as a fingerprint sensor (e.g., the fingerprint sensor 114 of the system 100 in FIG. 1). In some implementations where the optical touch interface is not an IR based multi-resolution screen, the fingerprint detection can be delivered by an ultrasound sensor.

In some implementations, the electrode touch display 110 of the present disclosure may include a full screen fingerprint identification system. In the high-resolution operation of the IR sensor array, the fingerprint pattern can be captured and recognized when compared to a saved pattern. In a close-up view, the fingerprint may have patterns that resemble a valley or elevated parts like a ridge with an approximate width of 200 µm. By analyzing the more or less IR reflective sections of the detected area, unique patterns on the surface, such as ridges or unique marks, can be detected. In order to reach high resolution for an acquired fingerprint pattern, the IR sensor units can have dimensions of 80 µm×80 µm.

Figure 20:
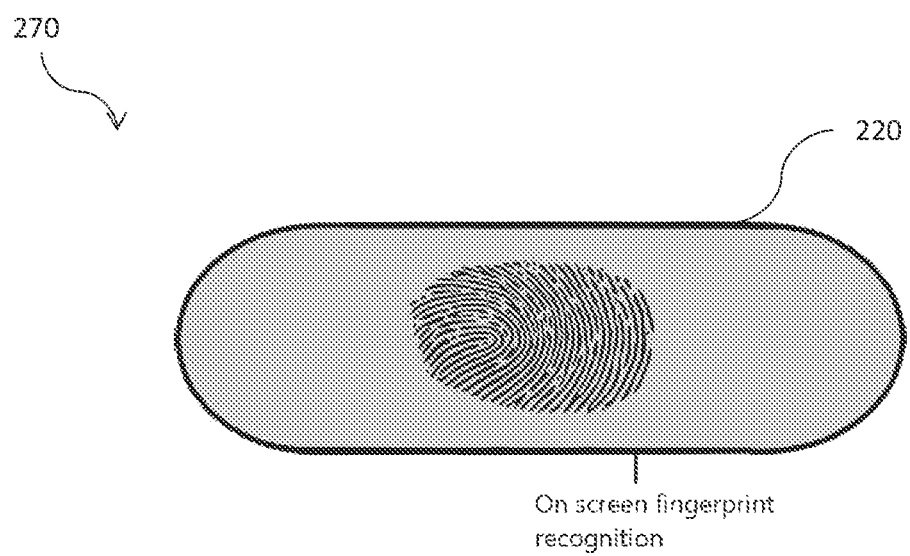
FIG. 20 illustrates an example visual indication of a fingerprint recognition on the side electrode touch display of FIG. 14, according to some implementations of the present disclosure.

Once the location of the finger has been triggered, the high-resolution image of the fingerprint is recorded. For example, FIG. 20 illustrates an example visual indication 270 of a fingerprint recognition on the electrode touch display integrated in the lateral interface 220. In some implementations, the image of the fingerprint may be enhanced to show ridges and valleys. Additionally or alternatively, in some implementations, the image of the fingerprint may be used to establish the exact location of the patterns along the finger. Further additionally or alternatively, in some implementations, the electrode touch display 110 may emit light to notify the user where to put the finger.

Figure 21:
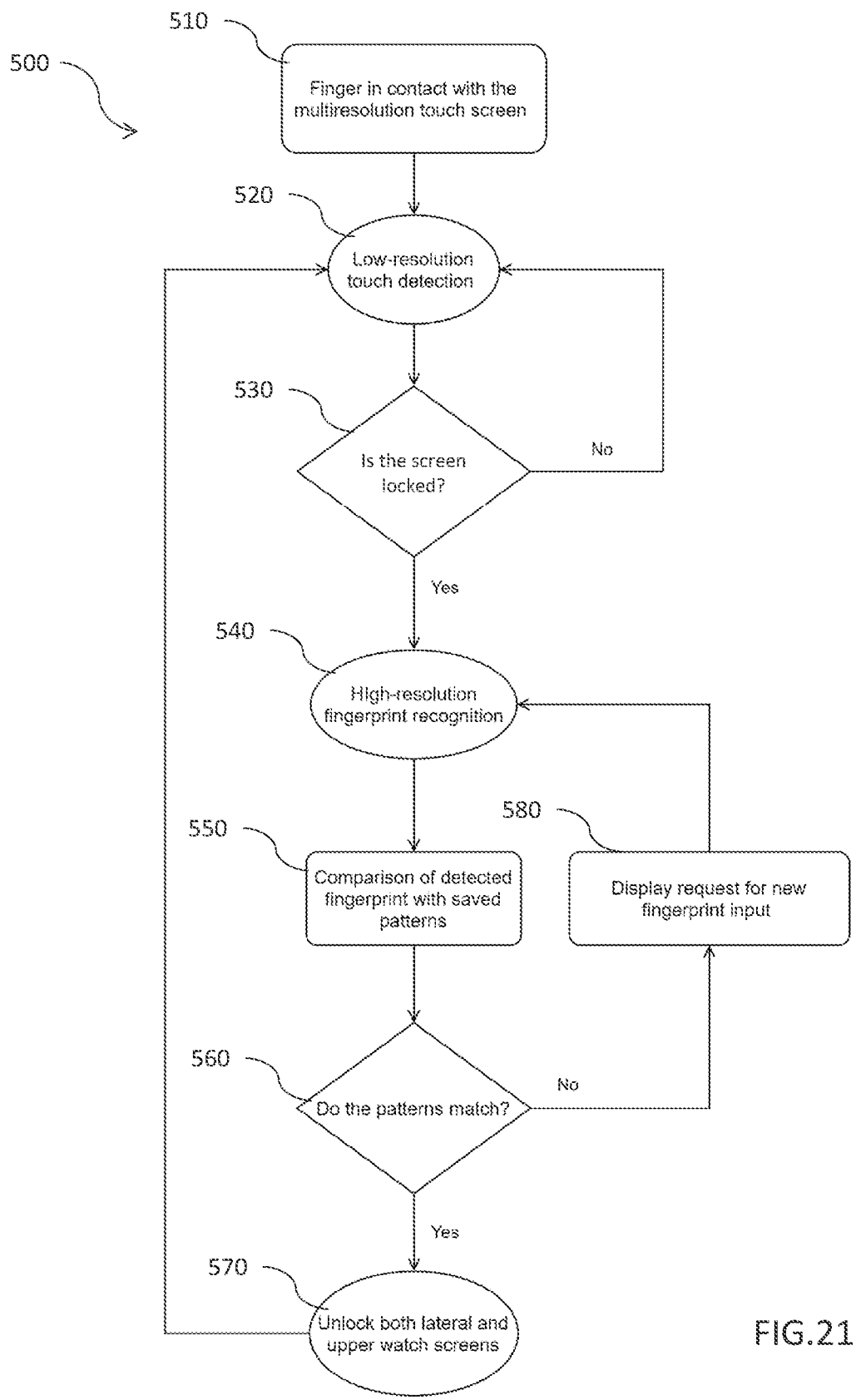
FIG. 21 is a flow diagram for touch detection and fingerprint unlocking, according to some implementations of the present disclosure.

Referring to FIG. 21, a flow diagram for a method 500 of touch detection and fingerprint unlocking is illustrated, which includes the switch steps between touch and fingerprint detection modes, and changing resolutions of the touch screen. The method 500 may be implemented using the systems and devices described herein, such as the system 100 and the smartwatch 200.

At step 510, a user's finger is in contact with the multiresolution touch screen (e.g., the electrode touch display 110 of the system 100). At step 520, the method performs low-resolution touch detection. Low-resolution is the default resolution setting, as touch detection is the principal interaction with the screen. The method 500 then proceeds to step 530 to determine whether the screen is locked. If the screen is not locked, the method 500 remains at its low-resolution touch detection (step 520) while the finger is in contact with the multiresolution touch screen (step 510).

At step 540, if the touch screen is locked, and a finger interacts with the screen, the IR sensing columns in the finger contact area switch into high-resolution mode, and activate all sensor units. Information from the IR sensor units is processed to create a biometric image of a fingerprint pattern. At step 550, the detected fingerprint is compared with saved patterns. At step 560, if the collected image matches any saved fingerprint, the method 500 proceeds to step 570 and the screen(s) in the smartwatch 200 unlock. If the fingerprint is not recognized (e.g., there is no match at step 560), a request for a new fingerprint input is displayed on the smartwatch 200's top interface 230 (step 580), and new data is recorded (e.g., by the lateral interface 220 and/or the top interface 230) using the IR sensor units in the contact area of the surface. In some implementations, when the detected fingerprint does not match the saved patterns at step 560, a haptic and/or visual feedback can be activated to indicate the error.

Once the screen is unlocked, the IR sensor columns can switch back to low-resolution mode, where only the central cluster of pixels in each column receives IR data. Under low-resolution functioning of the sensor array, only the location of a finger in contact with the screen is collected. The multiresolution touch screen can be locked again through gestures (e.g., double tapping), a period of inactivity (e.g., 30 seconds) or any other command from the user (e.g., selecting the screen lock configuration on the main smartwatch 200 screen). In some implementations, the multiresolution touch screen can be continuously unlocked if defined by the user in the smartwatch settings. Likewise, the duration for screen locking and the introduced fingerprints can be added by a user.

Figure 22:
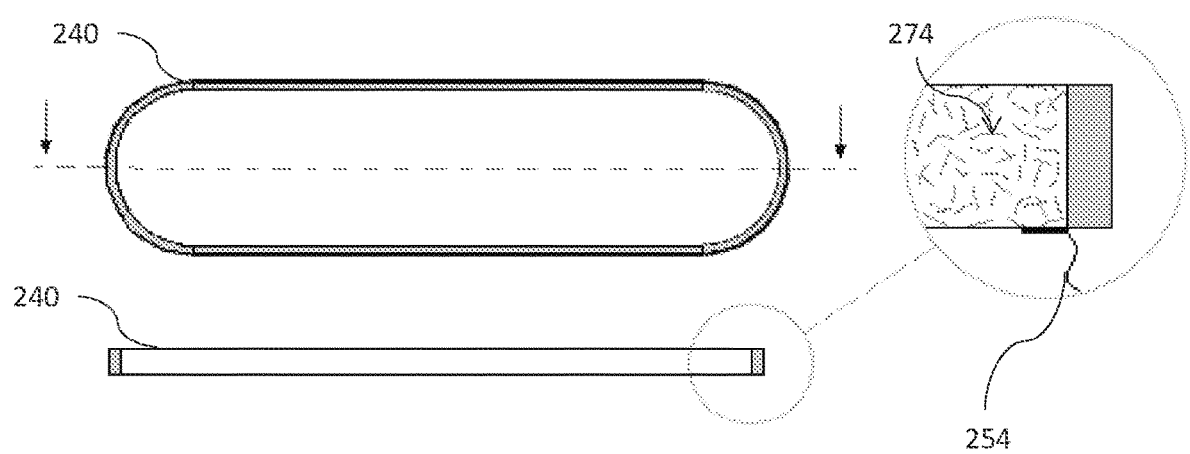
FIG. 22 illustrates a schematic view of a transparent electrode with metal nanoparticles and PCB connectors of the electrode touch display of FIG. 2, according to some implementations of the present disclosure.

FIG. 22 illustrates a schematic view of the composition of a transparent electrode based on embedded conductive nanowires. The schematic structure presents a metal nanowire (e.g., carbon nanotube) network 274 on flat glass substrates of the transparent electrode 240. The cross-sectional view of the central section of the transparent electrode 240 illustrates the electrode connector 254 that transmits the biometric signal from the transparent electrode 240 to the PCB.

One or more elements or aspects or steps, or any portion (s) thereof, from one or more of any of the below claims can be combined with one or more elements or aspects or steps, or any portion(s) thereof, from one or more of any of the other claims below or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A smartwatch comprising:
a multiresolution touch interface including:
a transparent conductive screen usable as a first electrode;
a display layer having a plurality of display pixels and positioned beneath a bottom surface of the transparent conductive screen;
an electrode contact coupled to the first electrode, the electrode contact positioned at the bottom surface of the transparent conductive screen and above the display layer; and
an array of IR sensors configured to detect infrared light transmitted through the transparent conductive screen;
a second electrode communicatively coupled to the first electrode, the first electrode and the second electrode together being configured to measure a bioimpedance of a user of the smartwatch; and
a third electrode coupled to a bottom portion of the smartwatch and configured to contact an extremity of the user, the first electrode and the third electrode together being configured to measure ECG data associated with the user.

2. The smartwatch of claim 1, wherein the third electrode of the smartwatch is configured to contact a wrist of the user, and wherein the first electrode and the third electrode together are configured to measure lead I ECG data associated with the user.

3. The smartwatch of claim 1, wherein the third electrode of the smartwatch is configured to contact a torso of the user, and wherein the first electrode and the third electrode together are configured to measure lead II or lead III ECG data associated with the user.

4. A multiresolution touch interface comprising:
a transparent conductive screen usable as a first electrode;
a display layer having a plurality of display pixels, the display layer being positioned beneath a bottom surface of the transparent conductive screen;
an electrode contact positioned between at least a portion of the transparent conductive screen and at least a portion of a transparent adhesive for facilitating conductivity from the first electrode to a printed circuit board;
an array of IR sensors configured to detect infrared light transmitted through the transparent conductive screen;
a transistor layer between the display layer and the array of IR sensors, wherein the transistor layer is configured to operate the plurality of display pixels; and
an insulating opaque substrate between the transistor layer and a PCB of the multiresolution touch interface.

5. The multiresolution touch interface of claim 4, wherein the transistor layer includes a transparent thin-film transistor.

6. The multiresolution touch interface of claim 4, wherein each of at least a portion of the plurality of display pixels includes an IR emitter for emitting infrared light detectable by the array of infrared sensors.

7. The multiresolution touch interface of claim 6, wherein each of at least the portion of the plurality of display pixels further includes an IR sensor of the array of IR sensors.

8. The multiresolution touch interface of claim 4, further comprising an IR emitter layer positioned above or below the display layer.

9. The multiresolution touch interface of claim 4, wherein the electrode contact is coupled to the first electrode to facilitate conductivity from the first electrode to the PCB of the multiresolution touch interface.

10. The multiresolution touch interface of claim 4, wherein the array of IR sensors is configured to detect a fingerprint of the user.

11. The multiresolution touch interface of claim 4, wherein the transparent conductive screen further includes a second electrode spaced apart from the first electrode.

12. The multiresolution touch interface of claim 11, wherein the first electrode and the second electrode are separately connected to the PCB of the multiresolution touch interface.

13. The multiresolution touch interface of claim 4, wherein the first electrode of the multiresolution touch interface and a second electrode external to the multiresolution touch interface together are configured to generate ECG data associated with the user of the multiresolution touch interface.

14. The multiresolution touch interface of claim 13, wherein the first electrode of the multiresolution touch interface is configured to contact a finger of a first extremity of the user, and the second electrode external to the multiresolution touch interface is configured to contact a portion of a second extremity of the user.

15. The multiresolution touch interface of claim 14, wherein the multiresolution touch interface is coupled to or integrated in a top interface of an electronic device, and the second electrode is coupled to or integrated in a lateral sidewall of the electronic device.

16. The multiresolution touch interface of claim 14, wherein the multiresolution touch interface is coupled to or integrated in a lateral interface of an electronic device, and the second electrode is coupled to or integrated in a bottom portion of the electronic device.

17. The multiresolution touch interface of claim 16, wherein the electronic device is a smartwatch configured to be worn on a wrist of the user such that the bottom portion of the electronic device contacts the wrist of the user.

* * * * *